United States Patent
Rouaix et al.

(10) Patent No.: US 7,504,949 B1
(45) Date of Patent: Mar. 17, 2009

(54) METHOD AND APPARATUS FOR INDIRECT ASSET TRACKING WITH RFID

(75) Inventors: François M. Rouaix, Seattle, WA (US); Peter G. Sajal, Shoreline, WA (US)

(73) Assignee: Amazon Technologies, Inc., Reno, NV (US)

( * ) Notice: Subject to any disclaimer, the term of this patent is extended or adjusted under 35 U.S.C. 154(b) by 329 days.

(21) Appl. No.: 11/440,211

(22) Filed: May 24, 2006

(51) Int. Cl.
*G08B 13/14* (2006.01)

(52) U.S. Cl. .................. 340/572.1; 340/10.1; 235/375

(58) Field of Classification Search ............. 340/572.1, 340/572.4, 572.7, 572.8, 568.1, 10.1; 235/375, 235/472.1

See application file for complete search history.

(56) References Cited

U.S. PATENT DOCUMENTS

| | | | | |
|---|---|---|---|---|
| 5,151,684 | A * | 9/1992 | Johnsen | 340/568.1 |
| 5,837,990 | A * | 11/1998 | Shepard | 235/472.01 |
| 5,886,634 | A * | 3/1999 | Muhme | 340/572.1 |
| 6,098,886 | A * | 8/2000 | Swift et al. | 235/472.01 |
| 6,462,659 | B1 * | 10/2002 | Schuette | 340/569 |
| 6,523,752 | B2 * | 2/2003 | Nishitani et al. | 235/375 |
| 6,614,351 | B2 * | 9/2003 | Mann et al. | 340/572.1 |
| 6,677,852 | B1 * | 1/2004 | Landt | 340/10.1 |
| 6,842,116 | B2 * | 1/2005 | Hum et al. | 340/572.1 |
| 6,853,293 | B2 * | 2/2005 | Swartz et al. | 235/472.01 |
| 6,878,052 | B2 * | 4/2005 | Andersson | 452/149 |
| 7,034,685 | B2 * | 4/2006 | Fabre et al. | 340/572.1 |
| 2002/0014955 | A1 * | 2/2002 | Klitsgaard | 340/10.42 |
| 2002/0044058 | A1 * | 4/2002 | Heinrich et al. | 340/572.1 |
| 2002/0067267 | A1 * | 6/2002 | Kirkham | 340/572.7 |
| 2006/0044112 | A1 * | 3/2006 | Bridgelall | 340/10.1 |

* cited by examiner

*Primary Examiner*—John A Tweel, Jr.
(74) *Attorney, Agent, or Firm*—Robert C. Kowert; Meyertons, Hood, Kivlin, Kowert & Goetzel, P.C.

(57) ABSTRACT

Method and apparatus for indirect asset tracking in materials handling environments with Radio Frequency Identification (RFID). In one embodiment, receptacles in a materials handling facility may be equipped with RFID tags. Agents within the materials handling facility may be equipped with RFID readers, which may be integrated in or attached to gloves, wristbands, or other devices. The location of each receptacle to which an RFID tag is attached may be associated with the unique identifier of the RFID tag. When an agent's hand approaches or enters a receptacle equipped with an RFID tag, the RFID reader may detect the presence of the RFID tag. This information, in combination with known information such as the location of the receptacles, may be used, for example, for information gathering and/or for quality checking in picking, stowing, rebinning, and/or other materials handling processes.

85 Claims, 13 Drawing Sheets

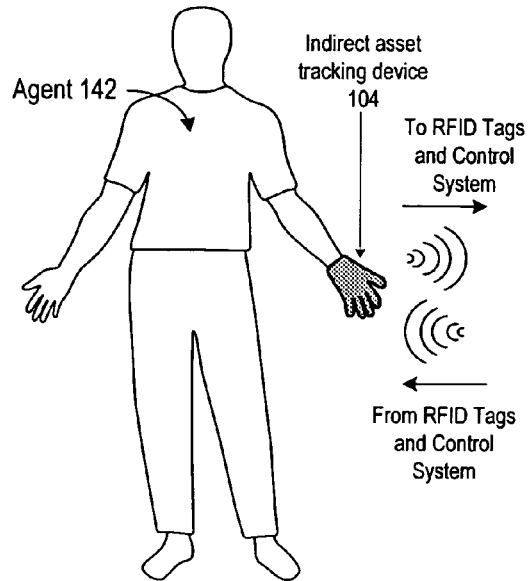
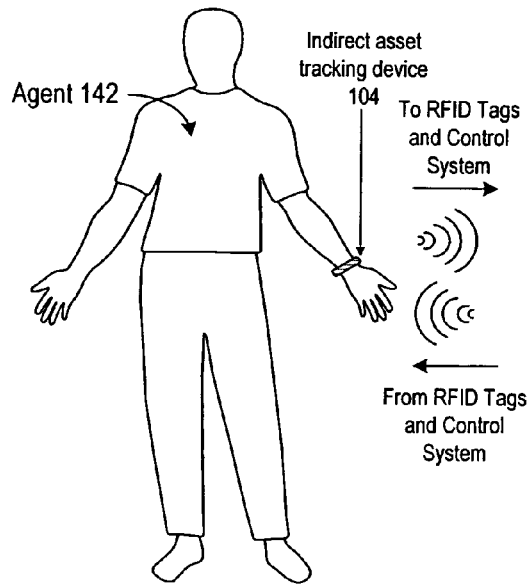
*Figure 5A*  *Figure 5B*
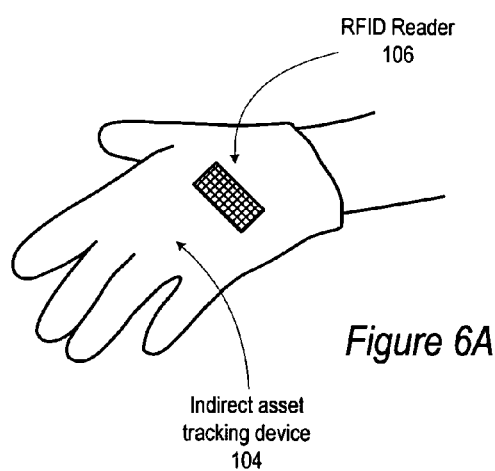
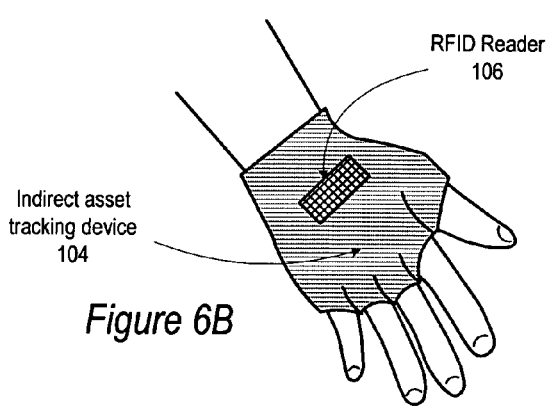
*Figure 6A*  *Figure 6B*
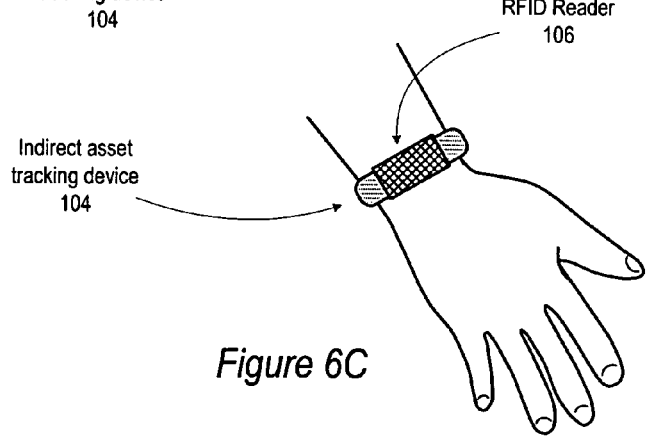
*Figure 6C*

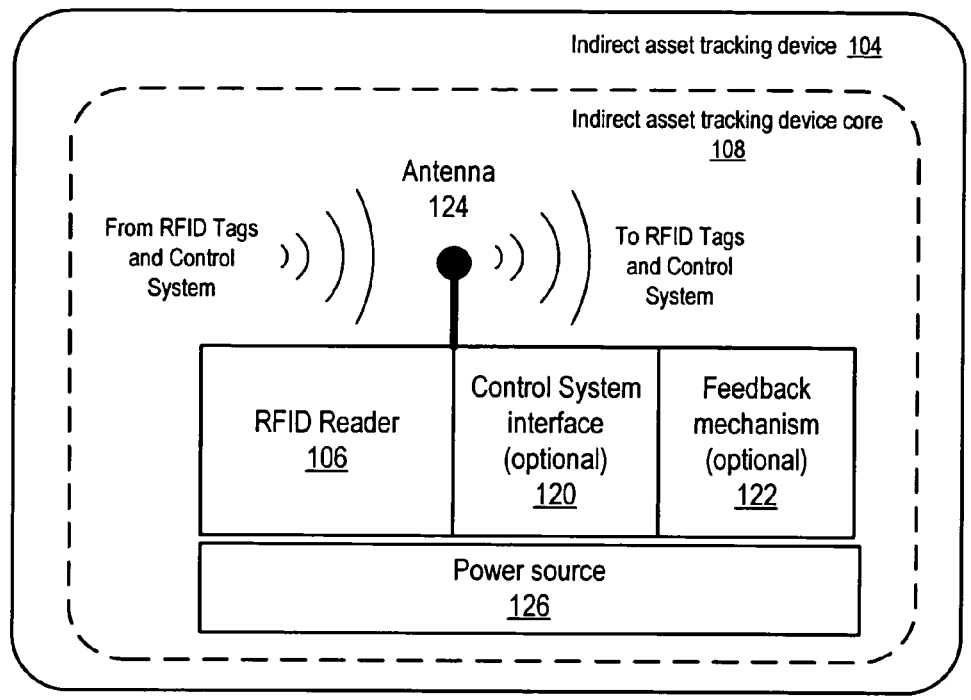
*Figure 7*
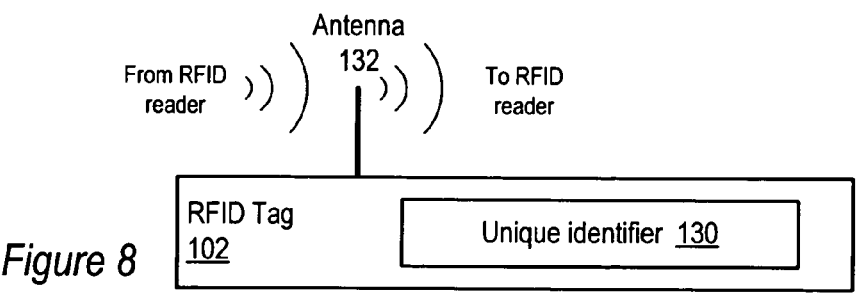
*Figure 8*
| RFID Tag | Location |
|---|---|
| 00000001 | Unit 1, Receptacle 1A |
| 00000002 | Unit 1, Receptacle 1B |
| 00000003 | Unit 1, Receptacle 1C |
| 00000004 | Unit 2, Receptacle 1A |
| 00000005 | Unit 2, Receptacle 1B |
| 00000006 | Unit 2, Receptacle 1C |
| 00000007 | Unit 2, Receptacle 1C |
| 00000008 | Cart 1 |
| 00000009 | Cart 1, Receptacle 2A |
| 00000010 | Cart 1, Receptacle 2B |
| 00000011 | Cart 1, Receptacle 2C |
| ... | ... |
*Figure 9A*
| Device | Agent |
|---|---|
| 00000001 | 1A |
| 00000002 | 1B |
| 00000003 | 1C |
| 00000004 | 2A |
| 00000005 | 2B |
| 00000006 | 2C |
| ... | ... |
*Figure 9B*

METHOD AND APPARATUS FOR INDIRECT ASSET TRACKING WITH RFID

BACKGROUND OF THE INVENTION

1. Field of the Invention

This invention relates to materials handling systems, such as inventory systems for order fulfillment.

2. Description of the Related Art

Inventory of various types of items may be maintained and processed at materials handling facilities which may include, but are not limited to, one or more of: warehouses, distribution centers, cross-docking facilities, order fulfillment facilities, inventory rental facilities, packaging facilities, shipping facilities, factories, or other facilities or combinations of facilities for performing one or more functions of material (inventory) handling. For example, retailers, wholesalers, rental services, and other product distributors (which may collectively be referred to as distributors) typically maintain an inventory of various items that may be ordered by clients or customers. As another example, manufacturers may maintain an inventory of parts and/or materials for use in manufacturing processes.

FIG. 1 illustrates a broad view of the operation of an exemplary conventional materials handling facility. This Figure illustrates an exemplary order fulfillment center of a product distributor. Multiple customers 10 may submit orders 20 to the product distributor, where each order 20 specifies one or more items from inventory 30 to be shipped to the customer that submitted the order. To fulfill the customer orders 20, the one or more items specified in each order may be retrieved, or picked, from inventory 30 (which may also be referred to as stock storage) in the materials handling facility, as indicated at 40. Picked items may be delivered or conveyed, if necessary, to one or more stations in the materials handling facility for sorting 50 into their respective orders, packing 60, and finally shipping 70 to the customers 10. Note that a picked, packed and shipped order does not necessarily include all of the items ordered by the customer; a shipped order may include only a subset of the ordered items available to ship at one time from one inventory-storing location.

A materials handling facility typically also includes a receiving 80 operation for receiving shipments of stock from one or more sources (e.g., vendors) and for placing the received stock into stock storage. The receiving 80 operation may also receive and process returned purchased or rented items or orders from customers. At least some of these items are typically returned to inventory 30. Note that some items received in receiving 80 may be delivered or "cross-docked" to other locations in the material handling facility than inventory 30, for example to packing 60 or shipping 70. Further, note that the various operations of a materials handling facility may be located in one building or facility, or alternatively may be spread or subdivided across two or more buildings or facilities.

RFID Tags and RFID Readers

Radio Frequency Identification (RFID) is a method of identifying unique items using radio waves. Typically, an RFID reader communicates with an RFID tag, which holds digital information in a microchip. Note that there are chipless forms of RFID tags that use material to reflect back a portion of the radio waves beamed at them.

RFID tags generally include a microchip attached to an antenna that is packaged in a way that it can be applied to an object. The RFID tag picks up signals from and sends signals to an RFID reader. An RFID tag may contain a unique serial number, and may also include other information, which may be transmitted to the RFID reader. RFID Tags come in many forms, such as smart labels that can have a barcode printed on them, or the RFID tag may simply be mounted inside a carton or embedded in plastic. RFID tags can be active, passive or semi-passive.

Active RFID tags generally include a transmitter to send back information, rather than reflecting back a signal from the reader, as a passive tag does. Most active tags use a battery to transmit a signal to a reader. However, some tags can gather energy from other sources. Active tags can be read from 300 feet (100 meters) or more, but are typically expensive. Active RFID tags are often used for tracking expensive items over relatively long ranges.

Passive RFID tags generally do not include a battery or other embedded power supply. When radio waves from an RFID reader reach the RFID tag's antenna, the energy is converted by the antenna into electricity that can power up the microchip in the RFID tag. The RFID tag is then able to send back information stored on the chip. Simple passive tags generally cost from U.S. 20 cents to several dollars, depending on the amount of memory on the tag and other features.

Semi-passive RFID tags may be similar to active RFID tags, but the battery is used to run the microchip's circuitry but not to broadcast a signal to the RFID reader. Some semi-passive tags sleep until they are woken up by a signal from the reader, which conserves battery life. Semi-passive tags may cost a dollar or more. These tags are sometimes called battery-assisted tags.

An RFID reader is a device used to communicate with RFID tags. The reader has one or more antennas, which emit radio waves and receive signals back from the RFID tags. An RFID reader is also sometimes called an interrogator because it "interrogates" the tag.

SUMMARY

Various embodiments of a method and apparatus for indirect asset tracking in materials handling environments with Radio Frequency Identification (RFID) are described. In one embodiment, receptacles, carts, and possibly other materials handling equipment in a materials handling facility may be equipped with RFID tags. Agents within the materials handling facility may be equipped with RFID readers, which may be integrated in or attached to gloves, wristbands, or other devices that may be worn or carried by the agents, that may activate and receive signals from the RFID tags when within range of the tags. The devices in which an RFID reader may be integrated to be carried by, attached to, or worn by an agent may collectively be referred to herein as indirect asset tracking devices.

Each RFID tag in a materials handling facility may include a unique identifier that uniquely identifies the RFID tag at least within the materials handling facility. In addition, the location within a materials handling facility of each receptacle or other asset to which an RFID tag is attached may be known. The location of each receptacle or other asset within a materials handling facility to which an RFID tag is attached, and/or other information relevant to the receptacle or other equipment to which the RFID tag is attached, may be associated with the unique identifier of the RFID tag. In one embodiment, a table or database that includes and associates this information may be maintained by a control system of the materials handling facility.

In one embodiment, when an agent's hand, or arm, to which an indirect asset tracking device is attached or on which an indirect asset tracking device is worn approaches or enters a receptacle (or other asset) equipped with an RFID tag, the RFID reader of the indirect asset tracking device may detect the presence of the RFID tag. The RFID tag may send its unique identifier to the RFID reader. This information collected via the indirect asset tracking device, in combination with known information such as the location of the receptacles and other equipment to which RFID tag(s) are attached, may be used, for example, for information gathering and/or for quality checking in picking, stowing, rebinning, and/or other materials handling processes. In one embodiment, the information may be used to implement an indoor positioning and tracking system for agents equipped with indirect asset tracking devices. In one embodiment, the information may be used in helping to locate misplaced receptacles or other equipment tagged with RFID tags in the materials-handling facility. Note that other uses for this information collected through the indirect asset tracking devices are possible and contemplated.

In embodiments, the merchandise or inventory items within the materials handling facility may not be equipped with RFID tags that are readable by the RFID readers of indirect asset tracking devices. Instead, receptacles that are used to store and/or transport the materials, and possibly other equipment that are used in materials handling, are equipped with RFID tags that are readable by the indirect asset tracking devices.

Embodiments may be implemented in materials handling facilities that implement a random-stow or other technique of co-locating items in a materials handling facility in which any item may be stored in any receptacle in inventory where physical space is sufficient. Embodiments may also be implemented in materials handling facilities that use other stow techniques, such as a stowage technique in which like items are stowed together in assigned receptacles.

Embodiments may be implemented in materials handling facilities that implement multi-destination picking or other picking techniques, for example to detect errors in the pick process. In materials handling facilities that implement multi-destination picking, embodiments may be used to detect errors in the pick process that may occur when the agent is placing picked items in one of two or more receptacles assigned to different destinations.

Various applications of embodiments of the indirect asset tracking mechanism may address one or more otherwise hard to detect errors in various materials handling activities. Embodiments of the indirect asset tracking mechanism may reduce the frequency of various human agent actions in materials handling processes such as barcode scanning. The indirect asset tracking device passively detects the location (receptacle) into which an item is placed or from which an item is picked, and may automatically detect an error in placement or picking and alert the agent, thus freeing the agent from having to actively scan the receptacle. Thus, embodiments may simplify one or more materials handling activities as well as detect errors in the activities, and hence may provide higher quality levels at lower costs when compared to conventional asset tracking mechanisms.

BRIEF DESCRIPTION OF THE DRAWINGS

FIGS. 5A and 5B illustrate exemplary human agents of a materials handling facility equipped with exemplary indirect asset tracking devices.

FIGS. 6A through 6C illustrate exemplary configurations for indirect asset tracking devices.

FIG. 7 is a block diagram illustrating an exemplary configuration for an indirect asset tracking device including an RFID reader according to one embodiment.

FIG. 8 is a block diagram that illustrates an exemplary configuration for an RFID tag according to one embodiment.

FIG. 9A illustrates an exemplary table that may be maintained and used by a materials handling facility control system to track RFID tags that are attached to or integrated with receptacles in a materials handling facility according to one embodiment.

FIG. 9B illustrates an exemplary table that may be maintained and used by a materials handling facility control system to track indirect asset tracking devices (RFID readers) that are assigned to agents in a materials handling facility according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
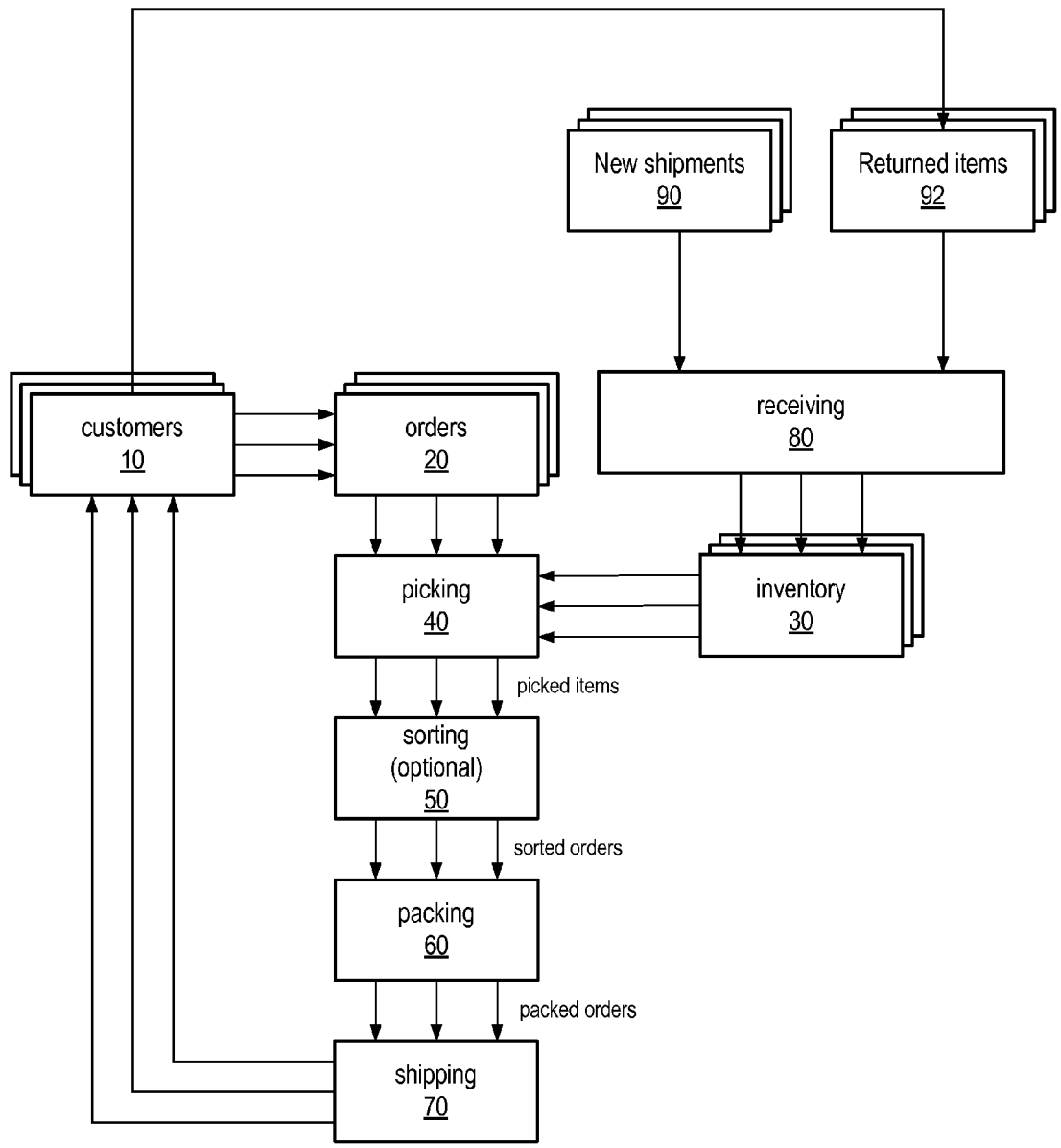
FIG. 1 illustrates a broad view of the operation of a conventional materials handling facility.
Figure 2:
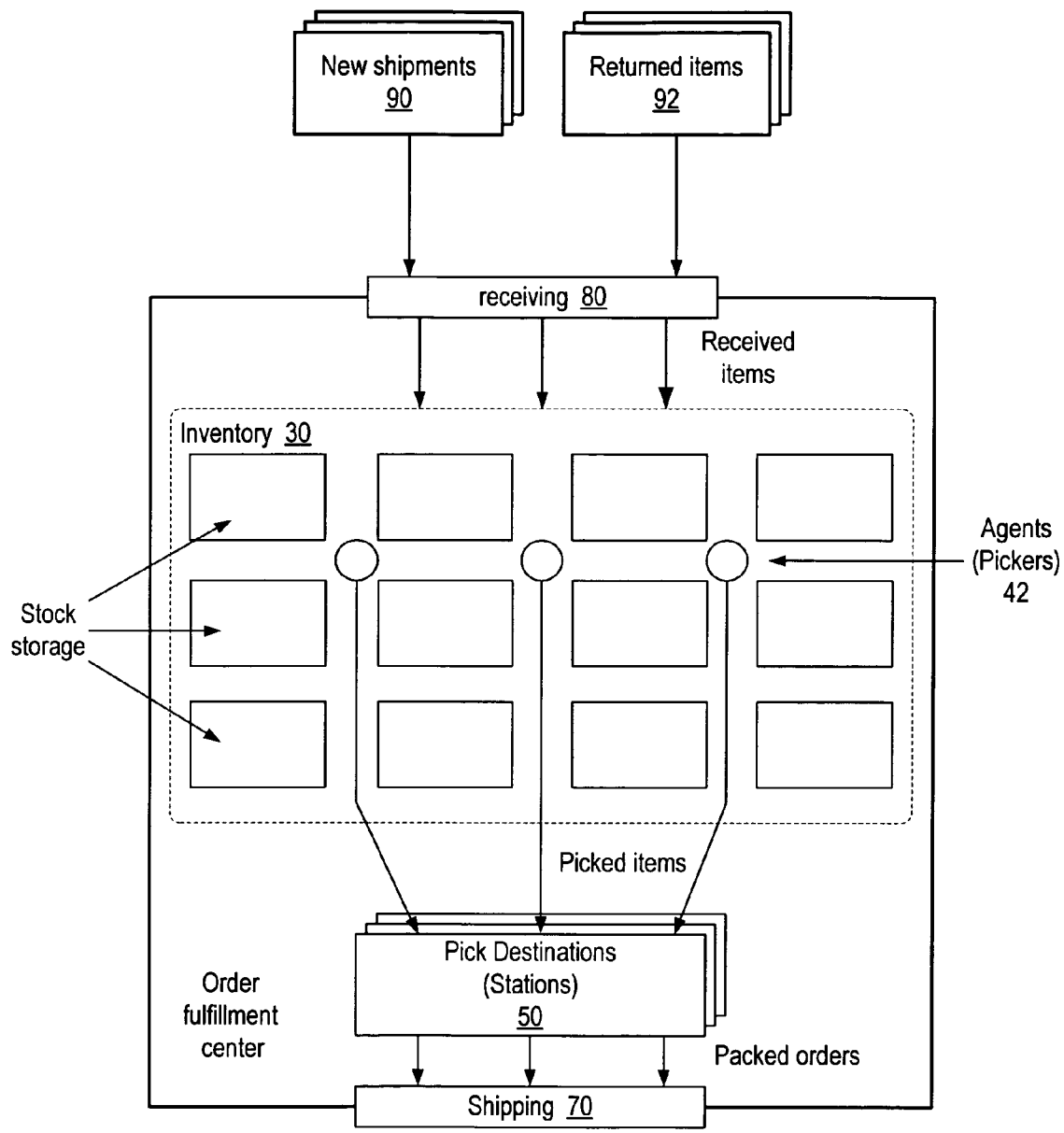
FIG. 2 illustrates an exemplary physical layout of an order fulfillment facility, according to one embodiment.

FIG. 2 illustrates an exemplary physical layout of an embodiment of a material handling facility, specifically an order fulfillment facility, or center. At any time, one or more agents 42 of the distributor may each be picking items from inventory 30 to fulfill portions or all of one or more orders. This may result in a stream and/or batches of picked items for multiple incomplete or complete orders, which may then be delivered to various stations (pick destinations 50), for example sorting or packing stations, in the materials handling facility for processing prior to shipping 70. A stream may be a continuous or nearly continuous flow of picked items arriving at a station, while groups of items arriving periodically or aperiodically at a station may be referred to as batches. Note that portions of an order may be received from the pickers 42, or from other stations, at a station at different times, so processing at a station may have to wait for one or more items for some orders to be delivered to the station from picking and/or from another station before completion of processing of the orders.

Agents, or pickers, 42 may receive instructions from a control system on a device such as an RF-connected wireless terminal or handheld scanner, to go to locations in inventory 30 to pick a list of items from those locations. A picker 42 may scan a picked item to determine if the right item was picked. The picker 42 may then place the picked item in a receptacle for receiving picked items. The receptacle may be located on or integrated with a mobile cart of some type. The mobile cart may or may not be a powered vehicle. There may be more than one receptacle on a cart. Alternatively, the receptacle may be located on or integrated with a basket or chassis that is physically attached to or carried by the picker.

In some embodiments, a picker 42 may pick items from inventory 30 for only one pick destination 50 at a time. For example, a picker 42 may be instructed to pick items for one order at a time, or items for a batch of orders all going to one pick destination 50 (e.g., to a particular automated sorting station, manual sorting station, packing station, or other processing station), or a list of items from various orders all going to a particular destination, etc. Thus, a picker 42 picks items for one stream or process path for the items, delivers the picked items to their common pick destination 50, and leaves the processing and sorting of the picked items into their individual orders to the downstream station(s). The picker then repeats the process for another list of items potentially for a different pick destination 50.

The stream or batches of incoming picked items are processed at a station 50, for example sorted into their respective orders at a sorting station. Once the processing of items for an order is completed at a station 50, the items may be delivered to another station 50 for further processing, for example to a sorting station to be sorted into orders or to a packing station to be packaged for shipping 70, or may be delivered to shipping 70 if processing is complete.

Note that an order fulfillment center may also include one or more receiving 80 stations for receiving shipments 90 of stock from various vendors. The received stock may then be placed into stock storage by one or more agents 42. The receiving 80 operation may also receive and process returned items 92 from customers. At least some of these items 92 are typically returned to inventory 30.

Further note that the various operations and stations of an order fulfillment center may be located in one building or facility, or alternatively may be spread or subdivided across two or more buildings or facilities.

Like items may be stored together within inventory 30 to facilitate inventory tracking and management. For example, items having a common Universal Product Code (UPC), Stock-Keeping Unit (SKU) code, or other designation (including proprietary designations) may be stored together within inventory 30. In a materials handling environment that includes a large number of many different items, it may be highly inefficient for a single employee to locate and pick every item for a given order. For example, the different items specified by a given order may be stored at mutually remote locations within the inventory facility, which would require a single agent to traverse a long path through the facility.

In order to make better use of inventory stocking space, it may be desirable to stock different items together in a single storage location or stocking area. Random-stow is one technique of co-locating items in a materials handling facility in which any item may be stored in any slot, bin, container, receptacle, etc. in inventory 30 where physical space is sufficient. Given some inventory profiles, random-stow may be more efficient than conventional inventory storage techniques where like items are assigned to specific locations, and where a single slot, bin, container, receptacle, etc. typically contains items with at most one UPC, SKU code, or other designation.

Random-stow is a relatively broad term, in this context, meant to include any situation in which sets of heterogeneous products may be randomly or pseudo-randomly distributed in a single slot, bin, container, receptacle, etc., and thus where one or more specific products may need to be removed from the slot, bin, container, receptacle, etc. in such a way that the identity of the product being removed at a particular moment is known.

Materials Handling Facility Control System

A materials handling facility such as the exemplary order fulfillment center of FIG. 2 may implement a materials handling facility control system, or control system for short. A control system, such as control system 190 of FIGS. 10, 12 and 13, may include hardware and software configured for assisting and/or directing agents 42 in the order fulfillment center in fulfilling orders. Items in inventory 30 may be marked or tagged with a bar code, Universal Product Code (UPC), Stock-Keeping Unit (SKU) code, serial number, and/or other designation (including proprietary designations) to facilitate order fulfillment center operations, including, but not limited to, stowing, rebinning, picking, sorting and packing. These designations, or codes, may identify items by type, and/or may identify individual items within a type of item. The control system may include hand-held, mobile and/or fixed scanners or scanning devices that may be able to scan, receive, or otherwise detect the marks or tags on individual items and communicate with a control station or stations of the control system to determine and record the item and/or item type of the items.

The control system may be able to receive order information for each order specifying the item or items to be picked to fulfill the order. Each order may be assigned a unique order number for use in the order fulfillment process. Item and/or item type information, including associated item and/or item type designations or codes and possibly other descriptive information, may be entered into the control system by the agent 42 for each item picked from inventory. This information may be scanned into the control system from marks or tags on the items or, alternatively, manually entered. A combination of scanning and manual entry may be employed during picking.

Note that, in some materials handling facilities, items may be stowed in inventory 30 in accordance with a random-stow technique or some other technique of co-locating items in a materials handling facility in which any item may be stored in any slot, bin, container, etc. in inventory 30 where physical space is sufficient. Alternatively, in some materials handling facilities, items may be stowed in inventory 30 in accordance with a stowage technique in which like items are stowed together in assigned slots, bins, containers, etc.

Indirect Asset Tracking with RFID

Various embodiments of a method and apparatus for indirect asset tracking in materials handling environments with Radio Frequency Identification (RFID) are described. Embodiments may use RFID devices for information gathering and quality checking, among other purposes, in materials handling environments. In one embodiment, receptacles, carts, and possibly other materials handling equipment in a materials handling facility may be equipped with passive RFID tags. Agents within the materials handling facility may be equipped with RFID readers that may activate and receive signals from the passive RFID tags when within range.

In one embodiment, the RFID readers may be integrated in or attached to gloves that may be worn by agents. In another embodiment, the RFID readers may be integrated in or attached to wristbands that may be worn by agents. Note that other embodiments may integrate RFID readers in other devices that may be attached to, carried by, or worn by agents, typically but not necessarily on the hand(s) or lower extremity of the arm(s) of the agents. The devices, objects and/or articles in which an RFID reader may be integrated to be carried by, attached to, or worn by an agent may collectively be referred to herein as indirect asset tracking devices.

Each RFID tag in a materials handling facility may include a unique identifier that uniquely identifies the RFID tag at least within the materials handling facility. In addition, in one embodiment, the expected, or assigned, location of each RFID tag within a materials handling facility may be known. This information (the assigned location) may be associated with the RFID tags when the RFID tags are applied to the receptacles or other equipment within the materials handling facility. Note, however, that at least some RFID tags may be attached to mobile receptacles or other mobile or movable equipment within the materials handling facility. The location of a receptacle or other equipment within a materials handling facility to which an RFID tag is attached, and/or other information relevant to the receptacle or other asset to which the RFID tag is attached, may be associated with the unique identifier of the RFID tag. In one embodiment, a table or database that includes and associates this information may be maintained by a control system of the materials handling facility.

In one embodiment, when an agent's hand, or arm, to which an indirect asset tracking device is attached or on which an indirect asset tracking device is worn approaches or enters a receptacle (or other asset) equipped with an RFID tag, the RFID reader of the indirect asset tracking device may detect the presence of the RFID tag. Note that the RFID reader may possibly detect multiple RFID tags if the RFID tags are within range of the RFID reader, but may detect only one of the RFID tags if the RFID reader's range is short enough. The RFID tag may send its unique identifier to the RFID reader. This information collected via the indirect asset tracking device (the unique identifier of the detected RFID tag(s)), in combination with known information such as the location of the RFID tag(s), may be used, for example, for information gathering (e.g., at what location in the order fulfillment center was an item placed, or was an item picked from?) and/or for quality checking in the picking, stowing, and/or rebinning processes (e.g., was this item placed in the correct location, or picked from the correct location?). In one embodiment, the information may be used to implement an indoor positioning and tracking system for agents equipped with indirect asset tracking devices. In one embodiment, the information may be used in helping to locate misplaced receptacles or other equipment tagged with RFID tags in the materials handling facility. Note that other uses for this information collected through the indirect asset tracking devices are possible and contemplated.

Note that, in one embodiment, the merchandise (materials; e.g., items in inventory 30 of FIG. 2) within the materials handling facility may not be equipped with RFID tags that are readable by the RFID readers in indirect asset tracking devices. Instead, receptacles that are used to store the materials, and possibly other equipment that are used in materials handling, are equipped with passive RFID tags that are readable by the RFID readers. Further note that, in one embodiment, the materials handling facility may include other RFID readers that can receive the signals from the RFID tags than those in indirect asset tracking devices attached to, carried by, or worn by human agents. In addition, note that, while embodiments are generally described herein as using passive RFID tags, some embodiments may be implemented using semi-passive RFID tags, active RFID tags, or a combination of two or more types of RFID tags.

Receptacles, as used herein, may include any fixed or mobile mechanism, object, fixture, shelf, container, bin, tote, basket, box, slot, chute, compartment, etc. configured to store items in inventory 30 and/or to receive picked items in a materials handling facility. One or more receptacles, such as totes or bins, may be mobile and thus configured to be placed on or removed from a stationary shelving unit, rack, pallet, floor, etc., or placed on or removed from a push cart, conveyor belt, roller, or other device for conveying the receptacles in the materials handling facility. A bin, tote, basket, or similar container, which may be subdivided into two or more compartments each of which is a receptacle, may include integrated wheels, rollers or some other mechanism for conveying the container in the materials handling facility. Alternatively, a receptacle may be fixed, for example fixed to the floor or on a shelving unit. In one embodiment, receptacles may be compartments or subdivisions in, for example, a bin, tote, basket or shelf.

Embodiments may be implemented in materials handling facilities that implement a random-stow technique or some other technique of co-locating items in a materials handling facility in which any item may be stored in any receptacle in inventory 30 where physical space is sufficient. Embodiments may also be implemented in materials handling facilities in which items are stowed in inventory 30 in accordance with a stowage technique in which like items are stowed together in assigned receptacles.

Some materials handling facilities may implement a picking technique in which picking agents, in one pick session, pick items to be delivered to one particular destination in the materials handling facility. Other materials handling facilities may implement a picking technique in which a picking agent may, in one pick session, pick items to be delivered to multiple (two or more) destinations in the materials handling facility. This technique may be referred to as multi-destination picking. Embodiments may be implemented in materials handling facilities that implement either of these picking techniques, or any other picking technique, for example to detect errors in the pick process. In materials handling facilities that implement multi-destination picking, embodiments may be used to detect errors in the pick process that may occur when the agent is placing picked items in one of two or more receptacles assigned to different destinations.

Note that conventional RFID-based asset tracking systems are generally direct asset tracking mechanisms that are based on fixed RFID readers, with RFID tags attached to mobile assets. Note that "assets" refers herein to the "materials" or merchandise/items in the materials handling facility. Embodiments of the method and apparatus for indirect asset tracking in materials handling environments using RFID as described herein are based on RFID tags on generally fixed equipment such as receptacles in stock storage and mobile RFID readers in indirect asset tracking devices which may be carried by, worn by, or attached to human agents. Embodiments of the indirect asset tracking mechanism do not require that assets (materials/merchandise/items) in the materials handling facility be tagged with RFID tags to track the individual assets. Further note that embodiments do not track assets (materials/merchandise/items) directly, but instead may track human agents, receptacles for the items, and possibly other materials handling equipment, which are the entities operating on or with the assets (e.g., human agents) and containing the assets (e.g., receptacles). In other words, embodiments may be used to indirectly track the assets (materials/merchandise/items) in the materials handling facility. Note that the number of entities operating on the assets (e.g., human agents) and containing the assets (e.g., receptacles) may be much lower than the total number of individual assets in a materials handling facility, even one or more orders of magnitude less than the number of individual assets. Therefore, indirect asset tracking may be more cost-effective than conventional direct asset tracking mechanisms, as fewer RFID tags, and possibly fewer RFID readers, may be required to implement an embodiment of the indirect asset tracking mechanism than are required to implement a direct asset tracking mechanism.

Various applications of embodiments of the indirect asset tracking mechanism may address one or more otherwise hard to detect defects or errors in various materials handling activities. Embodiments of the indirect asset tracking mechanism may reduce the frequency of various human agent actions in materials handling processes such as barcode scanning. For example, during a stow, rebin, or pick process, conventionally, an agent may be required to scan or otherwise enter a location (receptacle) into which an item is placed to verify that the item was placed in the correct receptacle. Using an embodiment of the indirect asset tracking mechanism, the indirect asset tracking device passively detects the location (receptacle) into which an item is placed, and may automatically detect an error in placement and alert the agent, thus freeing the agent from having to actively scan the receptacle. Thus, embodiments may simplify one or more materials handling activities as well as detect more defects or errors in the activities, and hence may provide higher quality levels at lower costs when compared to conventional asset tracking mechanisms.

Figure 3A:
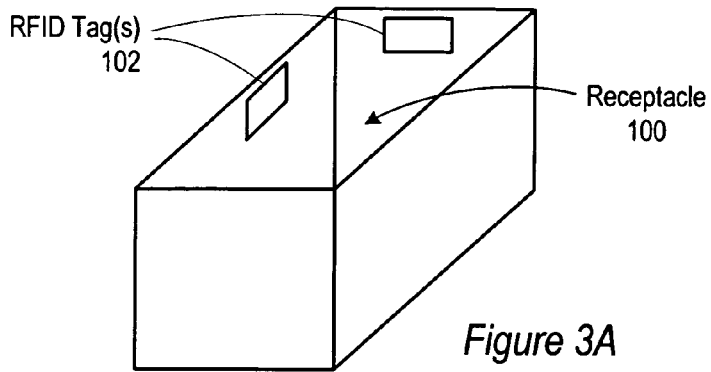
FIG. 3A illustrates RFID tag(s) attached to the inside of an exemplary receptacle (for example, a tote, a bin, or a container) according to one embodiment.

FIG. 3A illustrates RFID tag(s) attached to the inside of an exemplary receptacle (for example, a tote, a bin, or a container) according to one embodiment. This example shows two RFID tags 102 attached to the inside of receptacle 100. Note that one or more RFID tags 102 may be attached to or integrated with each receptacle 100 or other asset in a materials handling facility that is equipped with RFID tags 102. Further note that the one or more RFID tags 102 may be attached elsewhere on receptacle 100, for example on the outside instead of the inside, or on both the outside and the inside. As another example, two or more RFID tags 102 may be attached to receptacle 100 in a cluster of adjacent or nearly adjacent receptacles. In some embodiments, different receptacles 100 may have a different number of RFID tags 102 attached, and/or may have RFID tags 102 attached in different locations on the receptacles. Note that a materials handling facility may use exclusively one type or configuration of receptacle 100, primarily one type or configuration of receptacle 100, or a combination of two or more types or configurations of receptacles 100. Also note that RFID tags 102 and receptacle 100 are not necessarily shown to scale; an RFID tag 102 may typically be much smaller relative to the receptacle 100.

As noted, in some embodiments, at least some receptacles 100 may include two or more RFID tags 102. Including two or more RFID tags 102 may, for example, assist in determining the receptacle 100 that is currently being accessed by an agent equipped with an indirect asset tracking device if the RFID reader of the indirect asset tracking device reads RFID tags 102 from two or more receptacles that are within range of the RFID reader. In one embodiment, this determination may be performed according to a method that selects the receptacle 100 being accessed as the receptacle 100 for which the most RFID tags 102 are detected. For example, each receptacle 100 may be equipped with three RFID tags 102. When an agent picks an item from, or places an item in, a particular receptacle A, the RFID reader of the indirect tracking device may read all three RFID tags 102 of receptacle A, one RFID tag 102 of an adjacent receptacle B, and two RFID tags of an adjacent receptacle C. Since more tags were read for receptacle A, receptacle A is determined as the receptacle from which the item was picked, or to which the item was placed. Note that other embodiments may use other mechanisms to determine the receptacle 100 that is accessed by an agent equipped with an indirect asset tracking device. For example, the relative strength, duration, or other metric(s) of the signal from the RFID reader(s) 102 may be used to determine the receptacle 100 that is accessed.

Figure 3B:
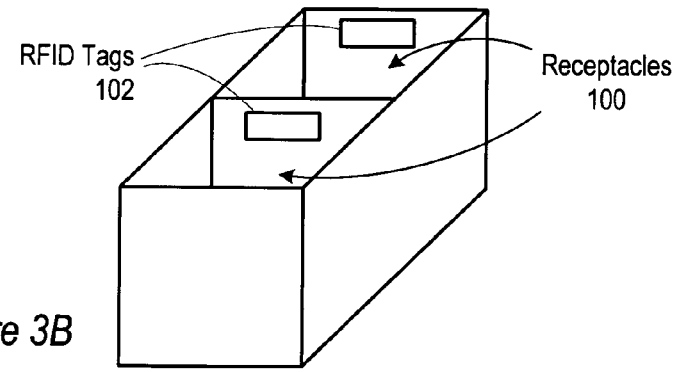
FIG. 3B illustrates RFID tag(s) attached to the inside of exemplary receptacles, wherein the receptacles are compartments or slots in a tote, bin, or container, according to one embodiment.

FIG. 3B illustrates RFID tag(s) attached to the inside of exemplary receptacles, wherein the receptacles are compartments or slots in a tote, bin, or container, according to one embodiment. Note that, while FIG. 3B shows two receptacles 100 of roughly equal size or dimension in a tote, bin or container, a tote, bin or container may include one, two, three or more such receptacles 100, the receptacles 100 may be arranged in any of a variety of configurations, and the receptacles 100 are not necessarily of equal size or dimensions. In some configurations, receptacles 100 may be adjustable in size, or in number, in a tote, bin or container.

Figure 4:
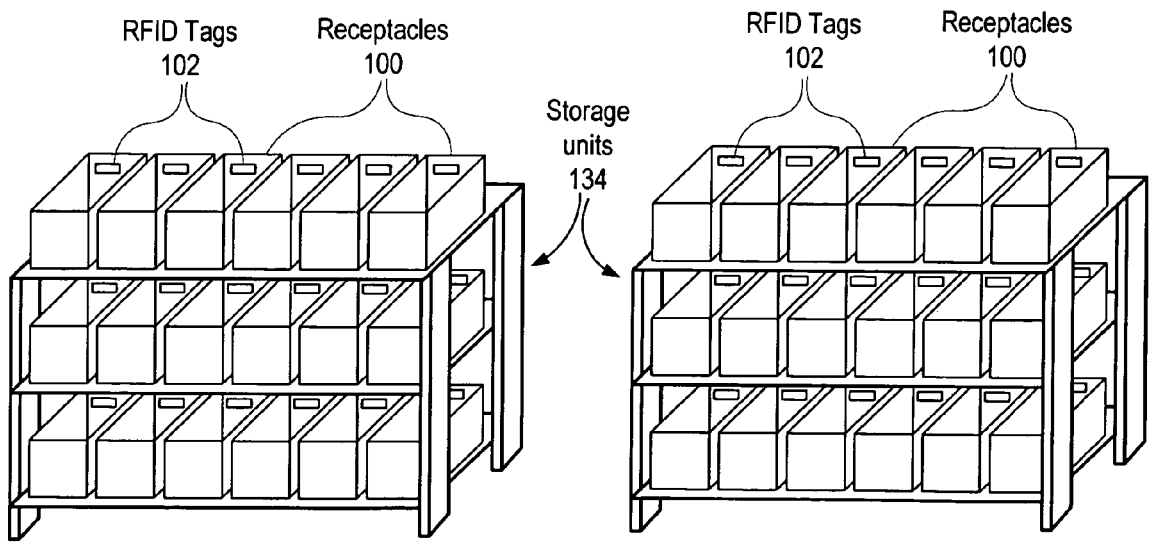
FIG. 4 illustrates exemplary storage units in stock storage of an inventory 30 in a materials handling facility wherein receptacles in the storage units each include at least one RFID tag according to one embodiment.

FIG. 4 illustrates exemplary storage units in stock storage of an inventory 30 in a materials handling facility wherein receptacles in the storage units each include at least one RFID tag according to one embodiment. In this example, the storage units are illustrated as shelving units or racks. Each shelving unit includes multiple shelves (in this example, three). Each shelf is configured to hold one or more totes, bins or containers which each may include, or be subdivided into, one or more receptacles 100 for receiving items to be stored in inventory 30. In this example, each tote, bin or container includes one receptacle 100, such as receptacle 100 of FIG. 3A. Note, however, that one or more of the totes, bins or containers may be subdivided into two or more receptacles 100, as described above for FIG. 3B. Note that the totes, bins or containers may be fixed on the shelves or mobile (removable from the shelves). Each receptacle 100 includes at least one RFID tag 102. In one embodiment, the storage unit or portions of the storage unit may be equipped with one or more RFID tags 102.

While FIG. 4 shows shelving units configured to hold totes, bins or containers, note that embodiments may be used with any type of storage units in stock storage, such as cabinets, drawers, shelves without totes, bins or containers, slots, racks, etc.

FIGS. 5A and 5B illustrate exemplary human agents of a materials handling facility equipped with exemplary indirect asset tracking devices. In FIG. 5A, indirect asset tracking device 104 is illustrated as an exemplary glove worn on the hand of agent 142. In FIG. 5B, indirect asset tracking device 104 is illustrated as an exemplary band, strap, or similar device worn on or attached to the wrist of agent 142. Note that other methods may be used in some embodiments to equip agents 142 with indirect asset tracking devices 104. For example, each agent may wear a long-sleeved shirt, jacket, or other garment, and an indirect asset tracking device 104 may be attached to or integrated with the garment at or near the end or cuff of the sleeve of the shirt.

Note that an indirect asset tracking device 104 such as the exemplary glove of FIG. 5A and the exemplary wristband of FIG. 5B may be worn on, or attached to, either the left or right arm of the agent 142, depending on the "handedness" of the agent. In one embodiment, each agent may wear (or have attached) two indirect asset tracking devices, one on each arm (e.g., as two gloves, or a wristband on each wrist). In some embodiments, indirect asset tracking devices 104 may be attached to, worn by, or carried by the agents 142 at one or more locations on the agent other than at or near the end of an arm or on the hand.

Each indirect asset tracking device 104 may include an RFID reader which may transmit to and receive from RFID tags in the materials handling facility. In one embodiment, the RFID reader, or alternatively another component of the indirect asset tracking device 104, may also transmit to and/or receive from a control system of the materials handling facility.

FIGS. 6A through 6C illustrate exemplary configurations for indirect asset tracking devices. In FIG. 6A, indirect asset tracking device 104 is illustrated as a full-fingered glove worn on the hand of agent 142. In FIG. 6B, indirect asset tracking device 104 is illustrated as an exemplary "fingerless" glove worn on the hand of agent 142. In both of these examples, the indirect asset tracking device 104 is illustrated as having an RFID reader 106 integrated with or attached to the glove on the back of the glove. Note that the RFID reader 106 may be integrated with or attached to a glove at other locations. Also note that the RFID readers 106 are not necessarily shown to scale; an RFID reader 106 may typically be much smaller relative to the indirect asset tracking device 104, but also may be larger.

In FIG. 6C, indirect asset tracking device 104 is illustrated as an exemplary band, strap, or similar device worn on or attached to the wrist of agent 142. The indirect asset tracking device 104 is illustrated as having an RFID reader 106 integrated with or attached to the device, in this example on the "back" of the hand or wrist. Note that the RFID reader 106 may be integrated with or attached to the device 104 at other locations. Also note that the RFID reader 106 is not necessarily shown to scale.

Further note that, in some embodiments, two or more RFID readers 106 may be integrated in or attached to an indirect asset tracking device 104.

FIG. 7 is a block diagram illustrating an exemplary configuration for an indirect asset tracking device including an RFID reader according to one embodiment. In one embodiment, the core 108 of the indirect asset tracking device 104 is essentially a very small, low-cost, low-power computer with wireless communications capability. The core 108 may include, but is not limited to: a processor, a memory, and a communications interface, such as a radio transmitter/receiver. The core 108 may include one or more functional components including, but not limited to: an RFID reader 106, a control system interface 120, one or more antennas 124, an optional feedback mechanism 122, and a battery or other power source 126. RFID reader 106 may be configured to read RFID tags attached to or integrated with receptacles or other equipment of the materials handling facility as described herein. Optional control system interface 120 may be configured to communicate information to and/or to receive information from a materials handling facility control system. (Note that, in one embodiment, this functionality may be integrated with RFID reader 106). Optional feedback mechanism 122 may include one or more lights, LEDs, LCDs, or other mechanisms for visually and/or audibly communicating with an agent of the materials handling facility to facilitate picking, stocking or other materials handling functions under direction of a control system as described herein. All of these components may be packaged together in a small package, which may be attached to or integrated with a glove, wristband, or other article or device that may be attached to, worn by, or carried by an agent, such as the exemplary indirect asset tracking devices illustrated in FIGS. 5A and 5B and in FIGS. 6A through 6C.

In one embodiment, each indirect asset tracking device 104 may be configured with a unique identifier, serial number, radio frequency or frequencies, etc., or a combination of two or more such identifiers, that uniquely identifies the indirect asset tracking device 104 among two or more indirect asset tracking devices 104 (and possibly other RFID readers) used in a materials handling facility. Using this information, the control system may distinguish among the two or more indirect asset tracking devices 104 (and possibly other RFID readers) for communications, location, tracking, and other purposes.

In one embodiment, each indirect asset tracking device 104 in a materials handling facility may be assigned to or associated with a particular agent of the materials handling facility. In one embodiment, this assignment may be permanent or at least permanent as long as the agent is employed by the materials handling facility. In one embodiment, an indirect asset tracking device 104 may be issued to an agent upon starting a work shift or at other times, and thus an agent may be assigned different indirect asset tracking devices 104 at different times, rather than being assigned a permanent indirect asset tracking device 104.

In one embodiment, the core 108 of the indirect asset tracking device 104 may be detachable from the glove, wristband, or other article or device that may be attached to, worn by, or carried by an agent. In this embodiment, an agent may be issued or may otherwise obtain a glove, wristband, or other article or device, and then may be issued or assigned a core 108 to be attached to the article or device.

Note that, in one embodiment, an agent may be issued or assigned two (or possibly more) indirect asset tracking devices 104, such as two gloves as illustrated in FIG. 5A or two wristbands as illustrated in FIG. 5B, both of which may be worn, attached to, or carried by the agent.

In one embodiment, an indirect asset tracking device 104 may be activated by remote command. In this embodiment, a materials handling facility control system may, for example, send a signal to an agent to stow an item in a receptacle, or to pick an item from a receptacle. The materials handling facility control system may activate the agent's indirect asset tracking device 104 at or near the same time, and may then deactivate the indirect asset tracking device 104 after the operation is complete. Alternatively, the control system may be configured to look for a certain motion of the indirect asset tracking device 104 to activate the device. For example, there may be a directional or motion detector in the indirect asset tracking device 104 that feeds information to the control system, which may then activate (or deactivate) the indirect asset tracking device 104 based on relative motion.

FIG. 8 is a block diagram that illustrates an exemplary configuration for an RFID tag according to one embodiment. An RFID tag 102 may include a microchip attached to an antenna 132 that is packaged in a way that it can be applied or attached to an object. The RFID tag 102 picks up signals from and sends signals to an RFID reader. An RFID tag 102 may contain a unique serial number or identifier 130, and may also include other information, which may be transmitted to the RFID reader when within range. Note that there are chipless forms of RFID tags that use material to reflect back a portion of the radio waves beamed at them.

One embodiment of the method and apparatus for indirect asset tracking in materials handling environments with RFID may use passive RFID tags. Passive RFID tags generally do not include a battery or other embedded power supply. Instead, when radio waves from an RFID reader reach the RFID tag's antenna, the energy is converted by the antenna into electricity that can power up the microchip in the RFID tag 102. The RFID tag 102 is then configured to send back information stored on the chip. Note that, in other embodiments, active RFID tags, semi-passive RFID tags, or a combination of two or more types of RFID tags may be used.

FIGS. 9A and 9B illustrate exemplary tables that may be maintained and used by a materials handling facility control system to track RFID tags and/or indirect asset tracking devices (RFID readers) in a materials handling facility according to one embodiment.

FIG. 9A illustrates an exemplary table that may be maintained and used by a materials handling facility control system to track RFID tags that are attached to or integrated with receptacles in a materials handling facility according to one embodiment. Each row in this table indicates an RFID tag unique identifier or serial number and a particular unit (e.g., a storage unit such as one of the exemplary storage units illustrated in FIG. 4) and receptacle 100 of the unit to which the particular RFID tag is attached or with which the RFID tag is integrated. Note that the association of this information in the table may allow the materials handling facility control system to track the physical location of the receptacles 100, and other equipment, of the materials handling facility, and to direct agents of the materials handling facility to appropriate storage units and receptacles 100.

In one embodiment, information on items in the materials handling facility may be linked to or associated with the entries in the table of FIG. 9A. For example, the control system may store information on items in inventory, and may link this information to storage units/receptacles or other locations in the materials handling facility. In one embodiment, a particular item may thus be associated with a particular receptacle 100 in a particular storage unit of the materials handling facility.

The first seven rows of exemplary table of FIG. 9A shows locations as storage units and receptacles. Note, however, that embodiments may include other sites, stations, carts, etc. as locations in the materials handling facility to which RFID tags are assigned or associated. For example, the fourth from the last row of the exemplary table shows the location of RFID tag 00000008 as Cart 1 (indicating that the associated RFID tag is attached to or integrated with Cart 1), such as the exemplary cart illustrated in FIGS. 10 and 11. The last three rows of the table correspond to receptacles on Cart 1 that each include an RFID tag.

In one embodiment, a receptacle 100 or other asset of the materials handling facility may have two or more attached to or integrated RFID tags. For example, in the table, Unit 2, Receptacle 1C is shown as having two associated RFID tags (RFID tags 00000006 and 00000007).

Note that the control system may dynamically update the table as information on the location of RFID tags (and the receptacle or other equipment to which the RFID tags are attached or in which the RFID tags are integrated) changes. For example, in some embodiments, a receptacle including an RFID tag may be removed from a storage unit and placed on a cart. As another example, a cart may be loaded with one or more receptacles for picking to the receptacles. In both cases, this information may be transmitted to the control system, which may then update the table.

FIG. 9B illustrates an exemplary table that may be maintained and used by a materials handling facility control system to track indirect asset tracking devices (RFID readers) that are assigned to agents in a materials handling facility according to one embodiment. In one embodiment, each indirect asset tracking device in a materials handling facility may be assigned to or associated with a particular agent of the materials handling facility. This information may be stored in a table such as the exemplary table of FIG. 9B. In one embodiment, this assignment may be permanent or at least permanent as long as the agent is employed by the materials handling facility. In one embodiment, an indirect asset tracking device may be issued to an agent upon starting a work shift or at other times, and thus an agent may be assigned different indirect asset tracking devices at different times, rather than being assigned a permanent indirect asset tracking device.

In one embodiment, as described in FIG. 7, the core (RFID reader) of the indirect asset tracking device may be detachable from the glove, wristband, or other article or device that may be attached to, worn by, or carried by an agent. In this embodiment, an agent may be issued or may otherwise obtain a glove, wristband, or other article or device, and then may be issued or assigned an RFID reader to be attached to the article or device.

Note that, in one embodiment, an agent may be issued or assigned two (or possibly more) indirect asset tracking devices, such as two gloves as illustrated in FIG. 5A or two wristbands as illustrated in FIG. 5B, both of which may be worn, attached to, or carried by the agent. In this case, each agent may be associated with two or more indirect asset tracking devices in the table.

Applications of Indirect Asset Tracking with RFID

The following sections describe several exemplary applications in materials handling facilities for embodiments of a method and apparatus for indirect asset tracking with RFID.

These applications may include one or more of, but are not limited to, a stow process using RFID tags and indirect asset tracking devices, a pick process using RFID tags and indirect asset tracking devices, a rebin process using RFID tags and indirect asset tracking devices, an indoor positioning and tracking system using RFID tags and indirect asset tracking devices, and a "lost asset" location mechanism using RFID tags and indirect asset tracking devices. Note, however, that these applications are exemplary, and that other applications are possible and contemplated.

Stow Processes Using RFID Tags and Indirect Asset Tracking Devices

Figure 10:
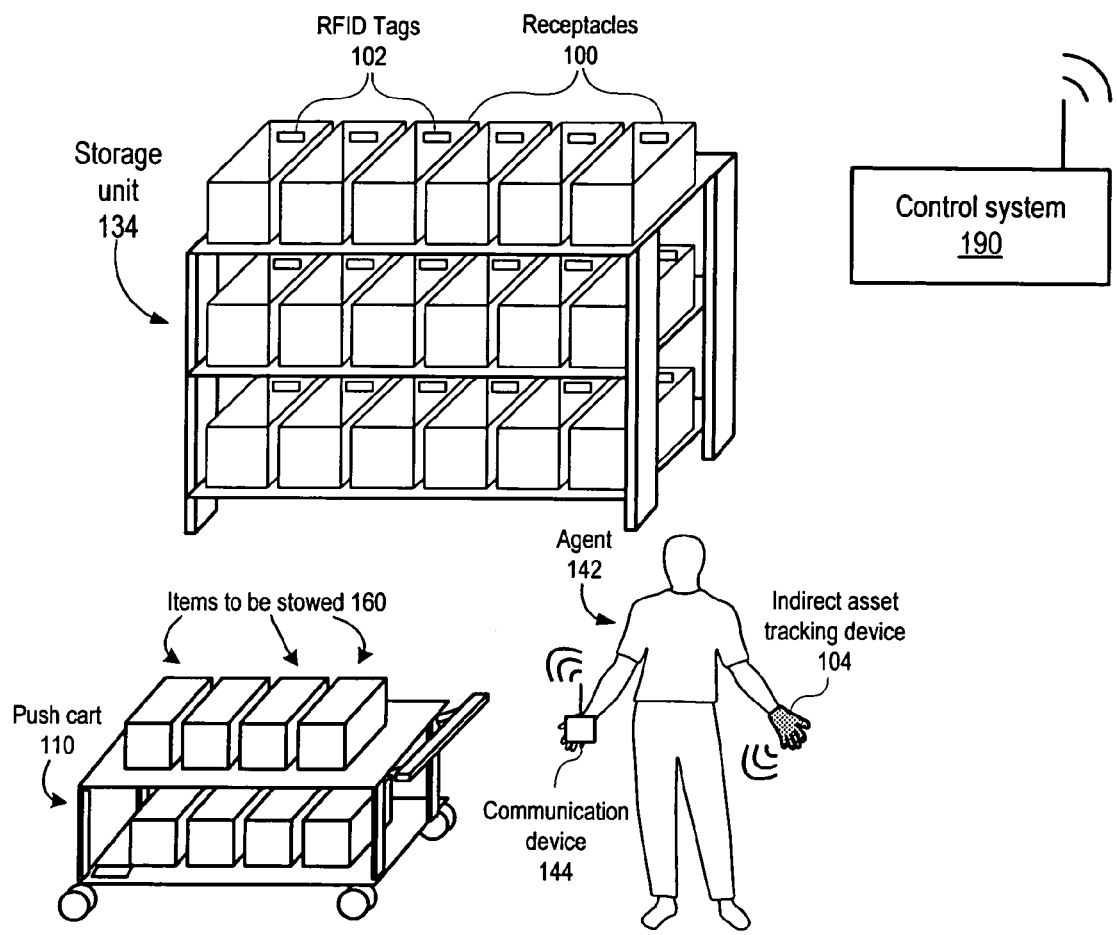
FIG. 10 illustrates an exemplary materials handling facility stow process using receptacles equipped with RFID tags and agents equipped with indirect asset tracking devices including RFID readers to read the RFID tags according to one embodiment.

FIG. 10 illustrates an exemplary materials handling facility stow process using receptacles equipped with RFID tags and agents equipped with indirect asset tracking devices including RFID readers to read the RFID tags according to one embodiment. This example primarily describes a random-stow process, a technique of co-locating items in a materials handling facility in which any item may be stored in any slot, bin, container, etc. in inventory where physical space is sufficient. Note, however, that embodiments may be used in conjunction with other types of stow processes or techniques or combinations thereof.

Note that push cart 110 in FIG. 10 is exemplary of an asset or device that may be used to move or convey items to be stowed 160 in a materials handling facility, and is not intended to be limiting. In some implementations, agents 142 may convey or move items to be stowed 160 with other configurations of carts 110 or with other types of devices for moving or conveying items 160. In some cases, an agent 142 may carry one or more items to be stowed 160 without the use of a device or other cart for moving or conveying items 160. Likewise, the storage unit in FIG. 10 is exemplary and is not intended to be limiting.

FIG. 10 illustrates an agent 142 equipped with an indirect asset tracking device 104 stowing items 160 on cart 110 to receptacles 100 equipped with passive RFID tags 102. Referring back to FIG. 2, note that items 160, may include items from receiving 80, for example one or more of items received in new shipments 90 and returned items 92. Items 160 may also include items from other locations or stations in the materials handling facility, for example items to be returned to stock from a downstream processing station 50 in a putback process. Putback refers to the process of putting items back into stock storage, for example any mispicked or extra picked items that are left over ("overage") at a sorting, packing or other downstream station of the materials handling facility. Items 160 may also, for example, include items being moved from one location in inventory 30 to another location in inventory 30. In general, any process that stows items from any source to receptacles in inventory 30 may be referred to as a stow process.

Returning to FIG. 10, agent 142 may navigate push cart 110 to a storage unit or location in stock storage, such as one of the exemplary storage units illustrated in FIG. 4. Once at a storage unit, agent 142 may select an item or items from cart 110 to be stowed in a receptacle 100. Note that receptacle 100 may be a bin, pallet, chute, tote, box, container, slot, shelf, drawer, cabinet or other subunit (receptacle 100) of the storage unit. Also note that, in a random-stow process, the agent 142 may determine the selection of the storage unit and receptacle 100 of a storage unit into which an item or items 160 are to be stowed. Note, however, that, in some implementations of a stow process, control system 190 may direct the agent 142 as to which storage unit and/or receptacle 100 of the storage unit the item(s) are to be stowed in. In some implementations of a stow process, control system 190 may direct the agent 142 as to which storage unit the item(s) are to be stowed in, and the agent 142 may then select a receptacle 100 of the storage unit in which to stow the item(s), for example according to a random-stow process. In some implementations of a stow process, control system 190 may direct the agent 142 as to which storage unit and/or receptacle 100 of the storage unit the item(s) are to be stowed in, but the agent 142 may override the direction of the control system 190 and stow the item(s) in a different receptacle 100 and/or storage unit according to a random-stow process. Note that other methods of selecting receptacles 100 in which to stow items 160 during a stow process are possible. Embodiments of the method of using RFID tags and indirect asset tracking devices in a stow process as described herein may be applied in any stow process.

Note that at least some items in inventory may be marked or tagged with a bar code, Universal Product Code (UPC), Stock-Keeping Unit (SKU) code, serial number, and/or other designation (including proprietary designations) to facilitate materials processing facility operations including, but not limited to, stowing, rebinning, picking, sorting and packing. In some materials handling environments, at least some items may be tagged with a radio frequency identification (RFID) tag. These designations, or codes, may identify items by type, and/or may identify individual items within a type of item. In one embodiment, before an item is stowed to a receptacle 100 of a storage unit, agent 142 may scan or otherwise enter the code for the item to be stowed 160 in communication device 144. Alternatively, the agent may select a button or other mechanism on the communication device 144 corresponding to the item 160 to indicate the item that is to be stowed. Communication device 144 may then send a message to the materials handling facility control system 190 indicating the item to be stowed. In one embodiment, the materials handling facility control system 190 may then indicate to the agent 142 the receptacle 100 to which the item 160 is to be stowed, via the communications device 144 or, alternatively, by some other mechanism, such as via a light or other indicator on the target receptacle 100 of the storage unit. In some embodiments, the functionality of communications device may be included with indirect tracking device 104 (e.g., integrated in the same glove, etc.).

Note that, in one embodiment, some or all of the items to be stowed 160 may be equipped with an RFID tag 102. In this embodiment, the agent 142 may not have to scan or otherwise enter the item(s) into control system 190. Instead, the RFID tags 102 on the items 160 may be passively read by the indirect asset tracking device 104, and this information may be communicated to the control system 190.

When the agent 142 stows an item 160 from cart 110 to a receptacle 100 of the storage unit, the RFID reader 106 of the indirect asset tracking device 104 of the agent 142 may read the RFID tag(s) 102 on the receptacle 100 when in proximity to the RFID tag(s) 102 of the receptacle 100 (i.e., when the agent extends his hand/arm into or near the receptacle 100 to stow the item 160). Indirect asset tracking device 104 may then communicate this information to the materials handling facility control system 190.

The passive detection of the receptacle 100 to which an item is being stowed by the indirect asset tracking device 104 reading the RFID tag 102 during the stowing motion frees the agent 142 from having to perform any other action or to expend any extra effort to indicate to the control system 190 as to which receptacle 100 the item has been stowed to. Thus, for example in an implementation using a random-stow process, embodiments may free the agent 142 from having to make any positive action or expend any extra effort, such as scanning a tag on the receptacle 100 or entering a receptacle identifier into communications device 144, to indicate to the control system 190 which receptacle 100 an item 160 has been stowed to. Instead, in one embodiment, the agent 142 may scan or otherwise enter an item 160, and then stow the item 160 in a selected receptacle 100. During the stow action, the indirect asset tracking device 104 may passively read the RFID tag 102 of the receptacle 100 to which the item 160 is stowed and communicate this information to the control system 190 to indicate to the control system 190 which receptacle the particular item was stowed to.

Note that, in some implementations, an agent 142 may scan or otherwise enter two or more similar or different items 160, or a case or box of similar or different items 160, and then stow the multiple items 160 in one motion to a receptacle 100.

In implementations where the control system 190 directs the agent 142 as to which receptacle 100 an item is to be stowed, the reading of the RFID tag 102 of the receptacle 100 by the indirect asset tracking device 104 may be communicated to and used by the materials handling facility control system 190, for example to verify that the agent 142 has stowed the item to the correct receptacle 100, and thus may be used to detect errors in stowing. In one embodiment, if the materials handling facility control system 190 detects from the information that the agent has stowed an item to an incorrect receptacle 100, an indication may be communicated to the agent 142 that the agent has stowed to the wrong receptacle 100.

Various audible and/or visible mechanisms may be used to communicate this indication to the agent 142, or a combination of two or more mechanisms may be used. In one embodiment, the indirect asset tracking device 104 may be configured to receive a response from the materials handling facility control system 190 indicating that a stow was made to a wrong receptacle 100, and to communicate that information to the agent 142. For example, the indirect asset tracking device 104 may be configured to audibly and/or visibly signal to the agent 142 that a stow was made to a wrong receptacle. In one embodiment, the receptacle(s) 100 of the storage unit may be configured to receive a response from the materials handling facility control system 190 indicating that a stow was made to a wrong receptacle, and to audibly and/or visibly communicate that information to the agent 142. In one embodiment, the communication device 144 may be configured to receive a response from the materials handling facility control system 190 indicating that a stow was made to a wrong receptacle, and to audibly and/or visibly communicate that information to the agent 142. In some embodiments, a combination of two or more of the above mechanisms may be used to indicate to the agent 142 that a stow was made to a wrong receptacle 100.

Note that an audible communication to the agent may be a beep, tone, buzz, bell, spoken message, or some other type of audible signal or a combination of two or more thereof that sounds to indicate to the agent 142 that a stow has been performed to the wrong receptacle 100. A visible communication to the agent may be a light, a text message, or some other type of visible signal or a combination of two or more thereof. The visible signal may, for example, be a light that comes on, that goes off, that flashes, and/or that changes in color or intensity to indicate to the agent 142 that a stow has been performed to the wrong receptacle 100.

Note that, while the above primarily describes a stow process to stow items 160 to be picked in an inventory such as inventory 30 of FIG. 2, a similar stow process using indirect asset tracking with RFID may be used to stow items 160 in other locations, stations, or storage areas or units in a materials handling facility.

Pick Process Using RFID Tags and Indirect Asset Tracking Devices

Figure 11:
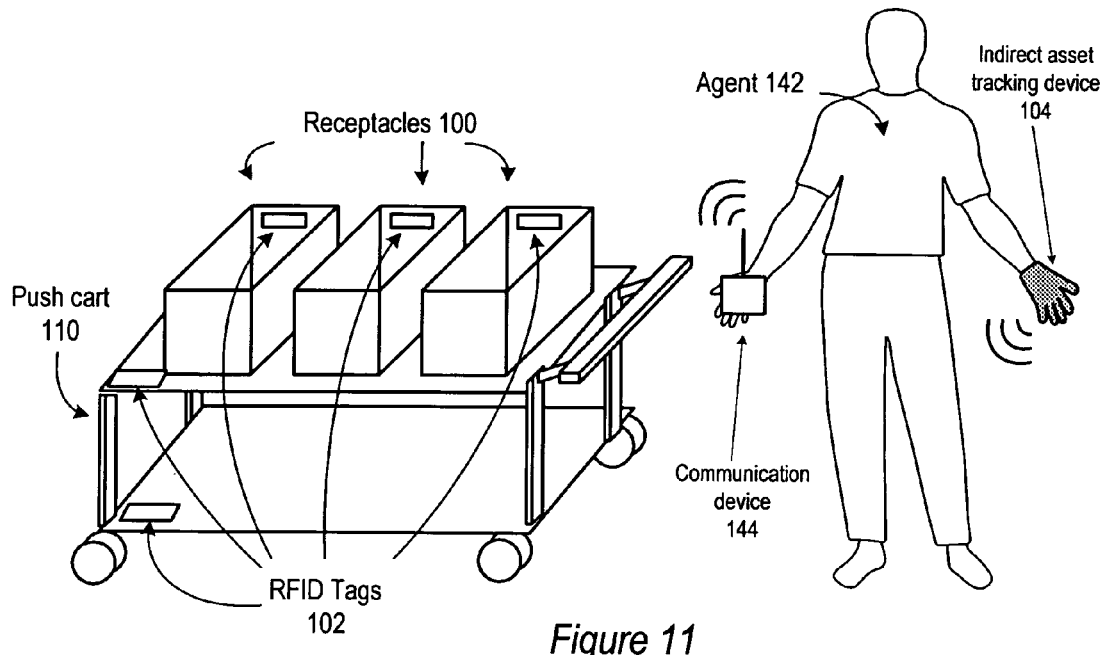
FIG. 11 illustrates an agent equipped with an indirect asset tracking device picking to receptacles equipped with passive RFID tags according to one embodiment.
Figure 12:
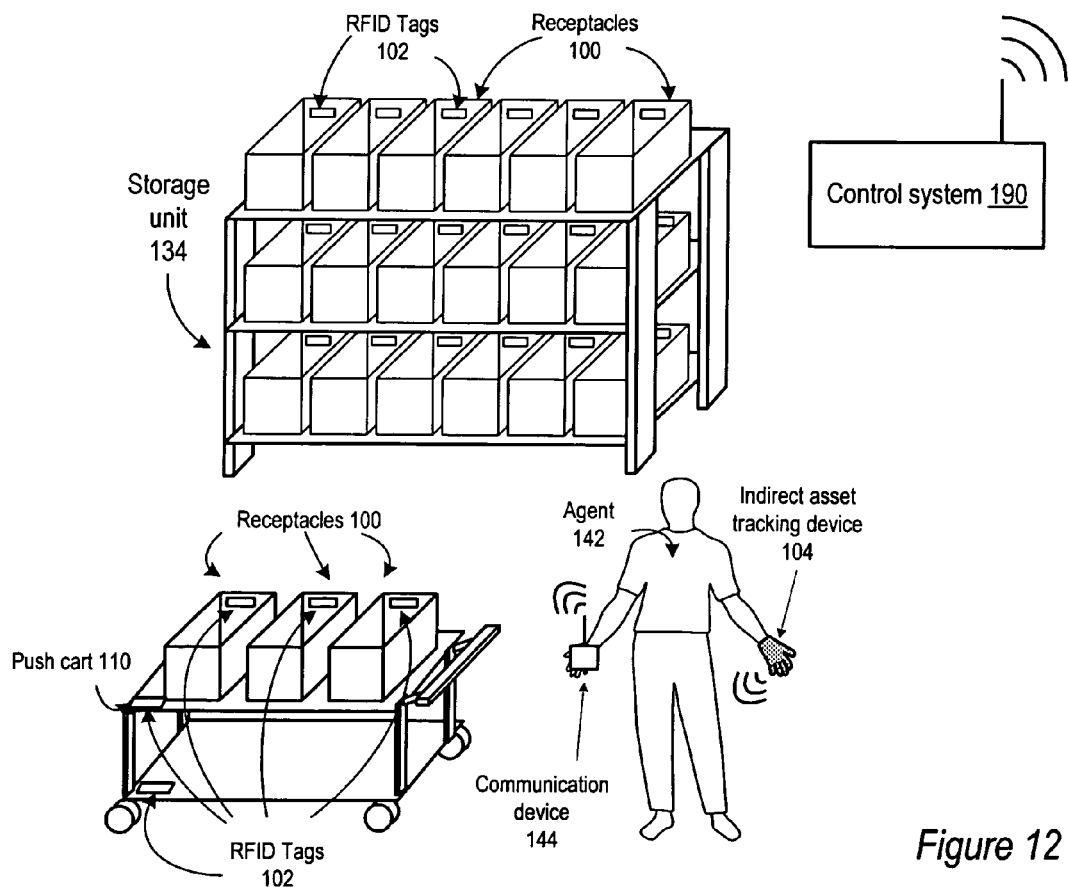
FIG. 12 illustrates an agent equipped with an indirect asset tracking device picking from receptacles equipped with passive RFID tags to receptacles equipped with passive RFID tags according to one embodiment.
Figure 13:
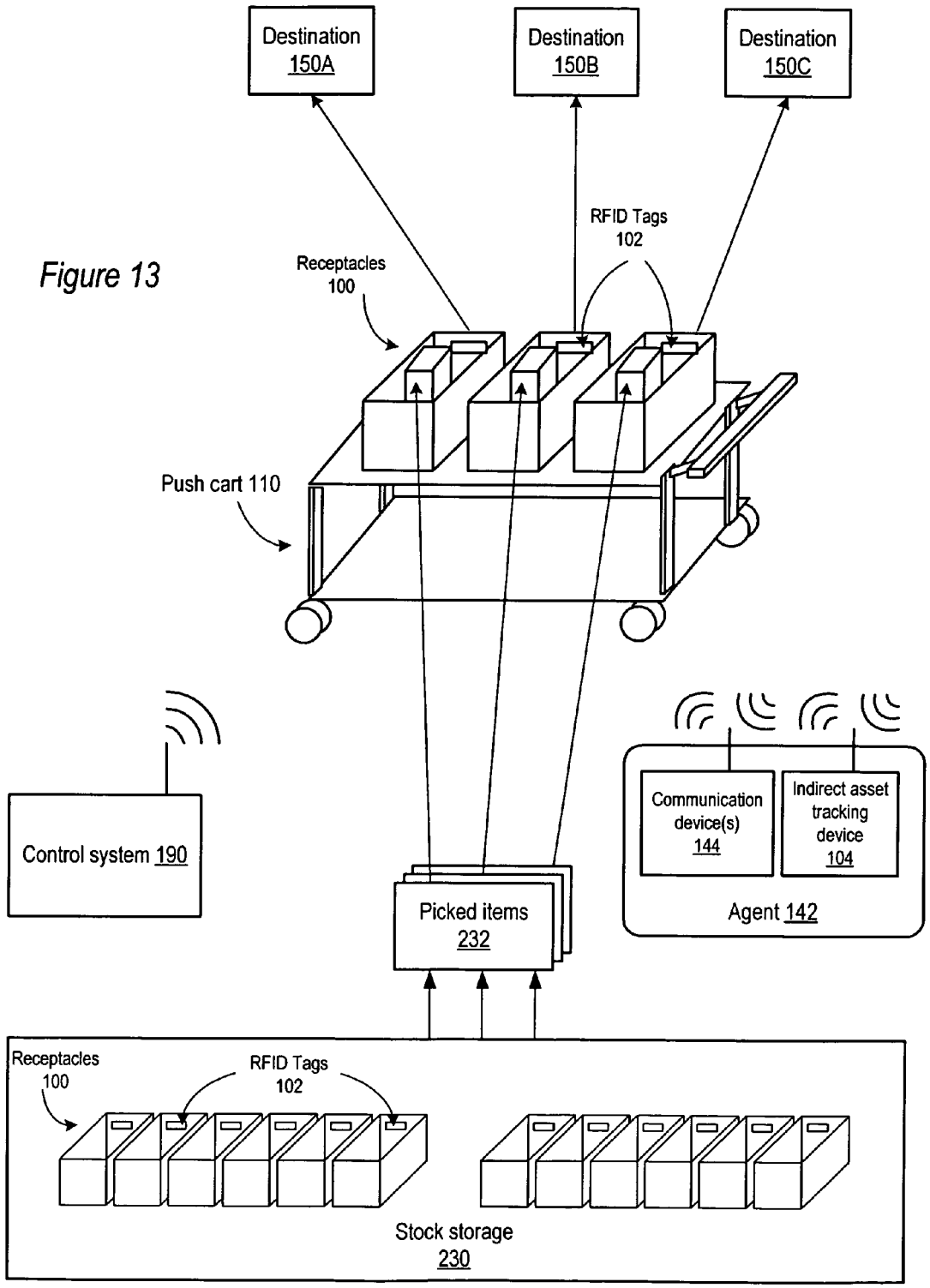
FIG. 13 illustrates operations of an exemplary materials processing facility implementing a multi-destination pick process with receptacles with RFID tags, agents equipped with indirect access tracking devices, and a control system according to one embodiment.

FIGS. 11, 12, and 13 illustrate an exemplary materials handling facility pick process using receptacles equipped with RFID tags and agents equipped with indirect asset tracking devices including RFID readers to read the RFID tags according to one embodiment. This example primarily illustrates a multi-destination pick process in which an agent may pick items for multiple destinations in one pick session, but note that embodiments may be used in other types of pick processes.

Note that push cart 110 in FIGS. 11 through 13 is exemplary and is not intended to be limiting. In some embodiments, agents may pick to other configurations of carts 110 and/or receptacles 100. Likewise, the storage unit in FIG. 12 is exemplary and is not intended to be limiting. Further note that, while FIGS. 11 through 13 describe an exemplary process of picking from receptacles 100 equipped with RFID tags 102 to receptacles 100 equipped with RFID tags 102 using an indirect asset tracking device 104 to read the RFID tags 102, some alternative implementations may use RFID tags 102 only on the receptacles 100 in storage units to detect the picking of items from the receptacles 100 using an indirect asset tracking device 104 to read the RFID tags 102, while other implementations may use RFID tags 102 only on the receptacles 100 to be picked to, for example the receptacles 100 on cart 110, to detect the picking of items to the receptacles 100 using an indirect asset tracking device 104 to read the RFID tags 102.

FIG. 11 illustrates an agent equipped with an indirect asset tracking device picking to receptacles equipped with passive RFID tags according to one embodiment. In this embodiment, agent 142 may be an employee of the materials handling facility with a push cart 110 configured to hold a plurality of storage bins or totes, where each tote (or, alternatively, each of one or more compartments within one or more of the totes) is a receptacle 100. The number and arrangement of receptacles 100 on the cart may vary from that shown. In one embodiment, the receptacles 100 may be mobile, so the receptacles 100 may be removed from or added to a cart 110, moved to different carts, rearranged on a cart, etc. In one embodiment, agent 142 may interact with a corresponding communication device 144, which may be a handheld device, a device worn by or attached to the agent, or a device integrated into or mounted on push cart 110.

Communication device 144 may be configured to convey instructions from a materials handling facility control system, such as control system 190 of FIG. 12, to agent 142 as to what actions to perform within the materials handling facility. Numerous different embodiments of communication device 144 are possible and contemplated. In some embodiments, communication device 144 may include a portable general-purpose computer system configured to execute an operating system and one or more applications, while in other embodiments, communication device 144 may include an embedded computer system configured to execute customized software applications. In various embodiments, communication device 144 may support numerous different interface mechanisms, such as video displays of various sizes and resolutions, audio input/output capabilities (e.g., for voice communication), optical (e.g., bar code) scanning devices, RFID detectors, wireless or wired network interfaces, or various combinations of these, which may be directly integrated within communication device 144 or implemented by separate devices interfaced with communication device 144.

In one embodiment, communication device 144 may receive from a materials handling facility control system 190 a list of items to be picked from storage units or locations in inventory (stock storage 230), such as the exemplary storage units illustrated in FIG. 4, and may present the items to pick and the particular receptacles 100 of the storage units from which to pick the items to agent 142 via a display portion of the device such as a screen. In one embodiment, communication device 144 may also receive and display a list of one or more destinations for the picked items in the materials handling facility from the control system. Agent 142 may then collect the receptacles 100 for the indicated destinations and place them on the cart. Any of a variety of methods may be used to assign receptacles 100 to destinations.

In one embodiment, at least one RFID tag 102 may be coupled to each receptacle 100. In one embodiment, as indicated in FIG. 3, an RFID tag 102 may be located near or at the top edge of the receptacle 100, or alternatively built into the rim of the receptacle 100. Mounting the RFID tag 102 at or near the top edge of the receptacles 100 may allow the RFID tag 102 to be visible and accessible when the receptacles 100 are nestably stacked. Note that, in other embodiments, the RFID tag 102 may be located in other positions on the inside or outside of the receptacle 100 than the position shown, either on the top edge or elsewhere on the sides or even bottom of the receptacle 100. Note that this may apply both to the receptacles 100 on cart 110 in FIGS. 11 through 13, and to the receptacles 100 of the storage unit of FIG. 12.

In one embodiment, an RFID tag 102 may uniquely identify an associated receptacle 100 among the receptacles 100 in the materials handling facility. In one embodiment, agent 142 may select a receptacle 100 from a repository for receptacles 100 in the materials handling facility, and the unique identifier of the RFID tag 102 of the receptacle 100 may be detected by the indirect asset tracking device 104 of agent 142 when in proximity to the RFID tag 102 during the selection process. In one embodiment, indirect asset tracking device 104 may then communicate this information to the materials handling facility control system. In one embodiment, the information may be communicated directly from the indirect asset tracking device 104 to a materials handling facility control system transmitter/receiver located somewhere in the materials handling facility. In one embodiment, the indirect asset tracking device 104 may communicate this information to the communication device 144, which may then relay the information to a materials handling facility control system transmitter/receiver located somewhere in the materials handling facility. Upon receiving the information, the materials handling facility control system may, for example, associate that particular receptacle 100 with a particular destination in the materials handling facility (e.g., one of one or more pick destinations 50 as illustrated in FIG. 2). This process may be repeated for each destination indicated to agent 142 on communication device 144. Note that the passive reading of the RFID tag 106 by the indirect asset tracking device 104 may free the agent 142 from having to actively scan or otherwise enter information on the receptacle 100 into the communication device 144.

In some embodiments, selected receptacles 100 may not initially be assigned to particular destinations. In one embodiment, a receptacle 100 may be assigned to a destination when placement of a first picked item for that destination in the receptacle 100 is detected by the indirect asset tracking device 104. In this embodiment, an agent 142 may select a receptacle 100 in which to place a particular picked item from one or more unassigned receptacles 100 on the cart. When the agent 142 places the picked item in the selected receptacle 100, the RFID reader 106 of the indirect asset tracking device 104 may read the RFID tag(s) 102 on the receptacle. Indirect asset tracking device 104 may then communicate this information to the materials handling facility control system, which may then associate the selected receptacle 100 with the known destination of the picked item. Subsequent items picked for that destination may then be placed in the receptacle 100 as indicated by the materials handling facility control system to the agent 142 via the communication device 144.

In one embodiment, agent 142 may be allowed to override the receptacle 100 indicated by the materials handling facility control system and place a picked item instead into a different, possibly unassigned, receptacle 100, for example a larger receptacle if the receptacle assigned to the destination is insufficiently large, or an empty, possibly unassigned receptacle if the receptacle assigned to the destination for the item lacks sufficient space for the picked item. When the agent 142 places the picked item in the receptacle 100, the RFID reader 106 of the indirect asset tracking device 104 may read the RFID tag(s) 102 on the receptacle and communicate this information to the materials handling facility control system, which may then associate the selected receptacle 100 with the known destination of the picked item.

FIG. 12 illustrates an agent equipped with an indirect asset tracking device picking from receptacles equipped with passive RFID tags to receptacles equipped with passive RFID tags according to one embodiment. In response to receiving instructions to pick various items, agent 142 may navigate push cart 110 to a first indicated storage unit or location (or, alternatively, to the closest indicated storage unit or location if the indicated storage units are not specifically ordered by the control system 190), such as one of the exemplary storage units illustrated in FIG. 4. Once at an indicated storage unit, agent 142 may select an instance of an indicated item from an indicated receptacle 100 of the storage unit. For example, agent 142 may retrieve an item from a bin, pallet, chute, tote, box, container, slot, shelf, drawer, cabinet or other indicated subunit (receptacle 100) of the storage unit.

When the agent 142 picks an item from a receptacle 100 of the storage unit, the RFID reader 106 of the indirect asset tracking device 104 of the agent 142 may read the RFID tag(s) 102 on the receptacle 100 when in proximity to the RFID tag(s) 102 of the receptacle 100 (i.e., when the agent extends his hand/arm into or near the receptacle 100 to pick the item). Indirect asset tracking device 104 may then communicate this information to the materials handling facility control system 190. This information may be used by the materials handling facility control system 190, for example, to verify that the agent 142 has picked an item from the correct receptacle 100, and thus may be used to detect errors in picking. In one embodiment, if the materials handling facility control system 190 detects from the information that the agent has picked an item from an incorrect receptacle 100, an indication may be communicated to the agent 142 that the agent has picked from the wrong receptacle 100, and that it is thus possible that the agent 142 has picked an incorrect item. Note that the passive detection of the receptacle 100 from which an item is being picked by the indirect asset tracking device 104 reading the RFID tag 102 during the picking motion frees the agent 142 from having to perform any other action or to expend any extra effort to indicate to the control system 190 which receptacle has been picked from.

Various audible and/or visible mechanisms may be used to communicate this indication to the agent 142, or a combination of two or more mechanisms may be used. In one embodiment, the indirect asset tracking device 104 may be configured to receive a response from the materials handling facility control system 190 indicating that a pick was made from a wrong receptacle, and to communicate that information to the agent 142. For example, the indirect asset tracking device 104 may be configured to audibly and/or visibly signal to the agent 142 that a pick was made from a wrong receptacle. In one embodiment, the receptacle(s) 100 of the storage unit may be configured to receive a response from the materials handling facility control system 190 indicating that a pick was made from a wrong receptacle, and to audibly and/or visibly communicate that information to the agent 142. In one embodiment, the communication device 144 may be configured to receive a response from the materials handling facility control system 190 indicating that a pick was made from a wrong receptacle, and to audibly and/or visibly communicate that information to the agent 142. In some embodiments, a combination of two or more of the above mechanisms may be used to indicate to the agent 142 that a pick was made from a wrong receptacle 100.

Note that an audible communication to the agent may be a beep, tone, buzz, bell, spoken message, or some other type of audible signal or a combination of two or more thereof that sounds to indicate to the agent 142 that a pick has been performed from the wrong receptacle 100. A visible communication to the agent may be a light, a text message, or some other type of visible signal or a combination of two or more thereof. The visible signal may, for example, be a light that comes on, that goes off, that flashes, and/or that changes in color or intensity to indicate to the agent 142 that a pick has been performed from the wrong receptacle 100.

In some cases, agent 142 may also inspect the condition of the picked item, and may select an item only if it is in suitable condition (e.g., is clean, undamaged, unopened, has an appropriate expiration date, or satisfies some other set of criteria). Note that this may result in the agent 142 re-picking an item if the picked item is not of suitable condition.

Note that at least some items in inventory may be marked or tagged with a bar code, Universal Product Code (UPC), Stock-Keeping Unit (SKU) code, serial number, and/or other designation (including proprietary designations) to facilitate materials processing facility operations including, but not limited to, stowing, rebinning, picking, sorting and packing. In some materials handling environments, at least some items may be tagged with a radio frequency identification (RFID) tag. These designations, or codes, may identify items by type, and/or may identify individual items within a type of item. In one embodiment, once an item has been picked from a receptacle 100 of a storage unit, agent 142 may scan or otherwise enter the code for the picked item in communication device 144. Alternatively, the agent may select a button or other mechanism on the communication device 144 corresponding to the item to indicate that the item was picked. Communication device 144 may then send a message to the materials handling facility control system 190 indicating the picked item. In one embodiment, the materials handling facility control system 190 may then indicate to the agent 142 the receptacle 100 assigned to the destination for the item, via the communications device 144 or, alternatively, by some other mechanism, such as via a light or other indicator on the target receptacle 100 on cart 110.

Note that, in one embodiment, some or all of the items to be picked may be equipped with an RFID tag 102. In this embodiment, the agent 142 may not have to scan or otherwise enter the picked item(s) into control system 190. Instead, the RFID tags 102 on the items may be passively read by the indirect asset tracking device 104, and this information may be communicated to the control system 190.

When the agent 142 places a picked item in a receptacle 100 of cart 110, the RFID reader 106 of the indirect asset tracking device 104 of the agent 142 may read the RFID tag(s) 102 on the receptacle 100 into which the item is placed when in proximity to the RFID tag(s) 102 of the receptacle 100 (i.e., when the agent extends his hand/arm into or near the receptacle 100 to place the item). Indirect asset tracking device 104 may then communicate this information to the materials handling facility control system 190. This information may be used by the materials handling facility control system 190, for example, to verify that the agent 142 has placed the picked item into the correct receptacle 100 on cart 110, and thus may be used to detect errors in picking. In one embodiment, if the materials handling facility control system 190 detects from the information that the agent has placed a picked item into an incorrect receptacle 100, an indication may be communicated to the agent 142 that the agent has picked into an incorrect receptacle 100. Various audible and/or visible mechanisms may be used to communicate this indication of a pick to an incorrect receptacle 100 of a cart 110 to the agent 142, or a combination of two or more mechanisms may be used, similar to those described above when picking from an incorrect receptacle 100 in a storage unit. Note that the passive detection of the receptacle 100 to which an item is being picked by the indirect asset tracking device 104 reading the RFID tag 102 during the placing motion frees the agent 142 from having to perform any other action or to expend any extra effort to indicate to the control system 190 which receptacle is being picked to.

In one embodiment, the communication device and/or control system 190 may not provide directions for a subsequent item to be picked to the agent until confirmation has been made that the current item being picked has been picked from the correct receptacle 100 and to the correct receptacle 100. Alternatively, detection via the indirect asset tracking device 104 that an item has been picked from an incorrect receptacle and/or picked to an incorrect receptacle may raise an exception or otherwise block the agent from continuing the pick session until the error has been resolved.

FIG. 13 illustrates operations of an exemplary materials processing facility implementing a multi-destination pick process with receptacles with RFID tags, agents equipped with indirect access tracking devices, and a control system according to one embodiment. In this embodiment, at least some operations of the materials handling facility may be directed, controlled, monitored, and/or recorded by a materials handling facility control system 190. Control system 190 may include hardware and software configured to direct employees of the materials handling facility (such as agent 142) in the various operations of the materials handling facility including one or more of, but not limited to: picking, sorting, packing, and shipping. The hardware of control system 190 may include, but is not limited to, one or more of any of various types of devices, including, but not limited to, personal computer systems, desktop computers, laptop or notebook computers, mainframe computer system(s), workstations, network computers, storage systems, printers, or other devices.

Communication device 144 may be configured to communicate with control system 190, for example via radio communication, wireless networking, and/or a wired communication protocol, to convey instructions from control system 190 to agent 142 as to what actions to perform while picking items for multiple destinations within the materials handling facility. Communication device 144 may include one or more of, but is not limited to: handheld devices, devices worn by or attached to the agent 142, and devices integrated into or mounted on any mobile or fixed equipment of the materials handling facility such as push carts, bins, totes, racks, shelves, tables, and work benches. Communication device 142 may include one or more of, but are not limited to: personal computer systems, desktop computers, rack-mounted computers, laptop or notebook computers, workstations, network computers, "dumb" terminals (computer terminals with little or no integrated processing ability), Personal Digital Assistants (PDAs) or other handheld devices, proprietary devices, printers, or any other devices suitable to communicate with control system 190. In general, a communication device 144 may be any device that can communicate with control system 190 and convey instructions to agent 142. In one embodiment, communication device 144 may be configured to scan or otherwise read or receive codes or identifiers of various components in the materials handling facility, including the codes of items 232 in inventory, and to communicate the entered codes to the control system 190 for use in directing agent 142 in the pick process. Components that may include such codes or identifiers that may be scanned or otherwise read or received by communication device 144 may include one or more of, but are not limited to, items 232, orders, sorting or other stations, bins, totes, compartments of partitioned totes, and even agents.

After all the items 232 for all the destinations 150 assigned to the agent 142 in this particular pick session have been picked and placed in the correct receptacles 100, for example using a pick method as described in FIGS. 11 and 12, the completed receptacles may be delivered or conveyed to their assigned destinations 150 under direction of the control system 190. Note that, while FIG. 13 illustrates the agent 142 picking items 232 from receptacles 100 in stock storage 230, agents may also pick items from elsewhere in the materials handling facility, such as from a receiving station. In the example illustrated in FIG. 13, a first receptacle 100 is assigned to and delivered, when complete, to destination 150A; a second receptacle 100 is assigned and delivered to destination 150B, and a third receptacle 100 is assigned and delivered to destination 150C. Note that two or more receptacles 100 may be assigned and delivered to one destination 150 by agent 142 in one pick session. After delivering the receptacles 100 to their assigned destinations 150, the agent 142 may then receive a new list of items and destinations and repeat the process.

In one embodiment, the control system 190 may communicate with agent 142 via communication device 144 to direct the agent to the destination 150 for each receptacle 100. In one embodiment, as an agent approaches a destination 150 (a station), the control system 190 may detect the one or more receptacles 100 on the agent's carts that are assigned to that station as their destination 150. In one embodiment, this detection may be performed by one or more RFID readers at or near the destination 150 reading the passive RFID tag(s) on the receptacles 100 and conveying this information to the control system 190. In one embodiment, the control system 190 may then activate an indicator on the receptacle(s) 100 to indicate to the agent that the receptacle(s) 100 are to be delivered to that destination 150. Alternatively, the control system 190 may message the agent 142 via the communication device 144 or some other mechanism as to which receptacle(s) 100 are to be delivered to that destination 150.

In other embodiments, the control system 190 may detect the proximity of the cart 110, the communication device 144, and/or the agent 142 to the destination 150, and indicate to the agent 142 via one or more mechanisms as to which receptacles 100 are to be delivered to that destination 150. In one embodiment, this detection may be performed by one or more RFID readers at or near the destination 150 reading a passive RFID tag(s) on the cart 110 to detect its proximity to the destination 150 and communicating this information to the control system 190. In one embodiment, this detection may be performed by detecting the location of the indirect asset tracking device 104 (and thus the agent 142) via the proximity of the indirect asset tracking device 104 to one or more RFID tags 102 attached to or integrated with materials handling equipment at or near the destination 150 in the materials handling facility. Other embodiments may use other methods or combinations thereof to detect the proximity of the cart 110, the communication device 144, and/or the agent 142 to the destination 150.

In one embodiment, an agent 142 equipped with an indirect asset tracking device 104 (which may be the picking agent 142 or another agent) may offload one or more receptacles 100 at a destination 150 as directed by control system 190. In one embodiment, during the offload, the RFID reader 106 of the indirect asset tracking device 104 of the agent 142 may read the RFID tag(s) 102 on a receptacle 100 being offloaded by the agent 142 when in proximity to the RFID tag(s) 102 of the receptacle 100 (i.e., when the agent extends his hand/arm into or near the receptacle 100 to offload the receptacle 100). Indirect asset tracking device 104 may then communicate this information to the materials handling facility control system 190, which may then use this information, for example, to determine if the receptacle 100 is being offloaded at the correct destination 150, or in other words to determine if a correct receptacle 100 is being offloaded at the destination 150. In one embodiment, the control system 190 may alert the agent 142 via the communication device 144 or some other audible or visible mechanism if an incorrect receptacle 100 is being offloaded at the destination 150 or if a receptacle 100 is being offloaded at the wrong destination 150. In one embodiment, the control system 190 may provide audible or visual feedback to the agent 142 that a correct offload of a receptacle 100 at a destination 150 was made.

Note that, in some materials handling facility pick process implementations, instead of offloading receptacles 100 containing picked items 232 at a destination 150, an agent 142 may instead or in addition offload the picked items 232 from the receptacles 100 at the destination 150. In one embodiment, during the offload of the items 232 from a receptacle 100, the RFID reader 106 of the indirect asset tracking device 104 of the agent 142 may read the RFID tag(s) 102 on a receptacle 100 from which an item 232 is being offloaded by the agent 142 when in proximity to the RFID tag(s) 102 of the receptacle 100 (i.e., when the agent extends his hand/arm into or near the receptacle 100 to offload the item). Indirect asset tracking device 104 may then communicate this information to the materials handling facility control system 190, which may use this information, for example, to determine if the item 232 is being offloaded at the correct destination 150 and/or if the item 232 is being offloaded from the correct receptacle 100. In one embodiment, the control system 190 may alert the agent 142 via the communication device 144 or some other audible or visible mechanism if an item 232 is being offloaded at an incorrect destination 150 or from an incorrect receptacle 100. In one embodiment, the control system 190 may provide audible or visual feedback to the agent 142 that a correct offload of an item 232 from a correct receptacle 100 at the destination 150 was made.

In some implementations, the materials handling facility may include a conveyance mechanism, such as a conveyor belt, onto which the agent 142 may induct the completed receptacles 100. The conveyance mechanism may then deliver the receptacles 100 to the appropriate stations assigned as destinations 150 in the materials handling facility. In one embodiment, the conveyance mechanism may be configured to automatically deliver receptacles 100 to the correct destinations 150 as directed by the materials handling facility control system 190. In one embodiment, the conveyance mechanism 190 may be equipped with RFID readers to read the RFID tags 102 on the inducted receptacles 100, and the control system 190 may then direct the conveyance mechanism as to which destination 150 the receptacles 100 are to be delivered. In one embodiment, an agent 142 equipped with an indirect asset tracking device 104 (which may be the picking agent 142 or another agent) may induct each receptacle 100 onto the conveyance mechanism. The RFID reader 106 of the indirect asset tracking device 104 of the agent 142 may read the RFID tag(s) 102 on a receptacle 100 being inducted by the agent when in proximity to the RFID tag(s) 102 of the receptacle 100 (i.e., when the agent extends his hand/arm into or near the receptacle 100 to induct the receptacle). Indirect asset tracking device 104 may then communicate this information to the materials handling facility control system 190, which may then use this information to direct the conveyance mechanism as to which destination 150 the receptacle 100 is to be delivered.

In some embodiments, the actions of agent 142 may be partially or completely performed by an autonomous robot. For example, in some embodiments both item picking and transportation may be performed robotically, whereas in other embodiments items may be picked by human employees equipped with indirect asset tracking devices 104, while robotic push carts 110 operate independently of the human pickers. In an embodiment where item picking is performed by an autonomous robot, an indirect asset tracking device 104 may be integrated with or attached to each mechanism, or "arm", of the robot that extends into receptacles 100 to pick items from the receptacles. Note that, in this embodiment, information on RFID tags 102 read by the RFID reader 106 of the indirect asset tracking device 104 may be passed to the control system and/or directly to the autonomous robot to monitor, verify and control the picking actions of the robot.

In some embodiments, push carts 110 may be replaced with other conveyance systems such as such as conveyor belts, track-based carts, AGVs (Automated Guided Vehicles), wheel-mounted shelving units etc., or some agents 142 may carry one or more receptacles 100 without the use of a push cart 110. As previously noted, in embodiments employing push carts 110, the configuration of receptacles 100 may vary in various embodiments. For example, push carts 110 may have more or fewer receptacles 100 than shown, and receptacles 100 may be arranged in different fashions, such as by varying the angle at which receptacles 100 are mounted in order to facilitate access to receptacles 100 at various heights on carts 110.

Rebin Process Using RFID Tags and Indirect Asset Tracking Devices

Figure 14:
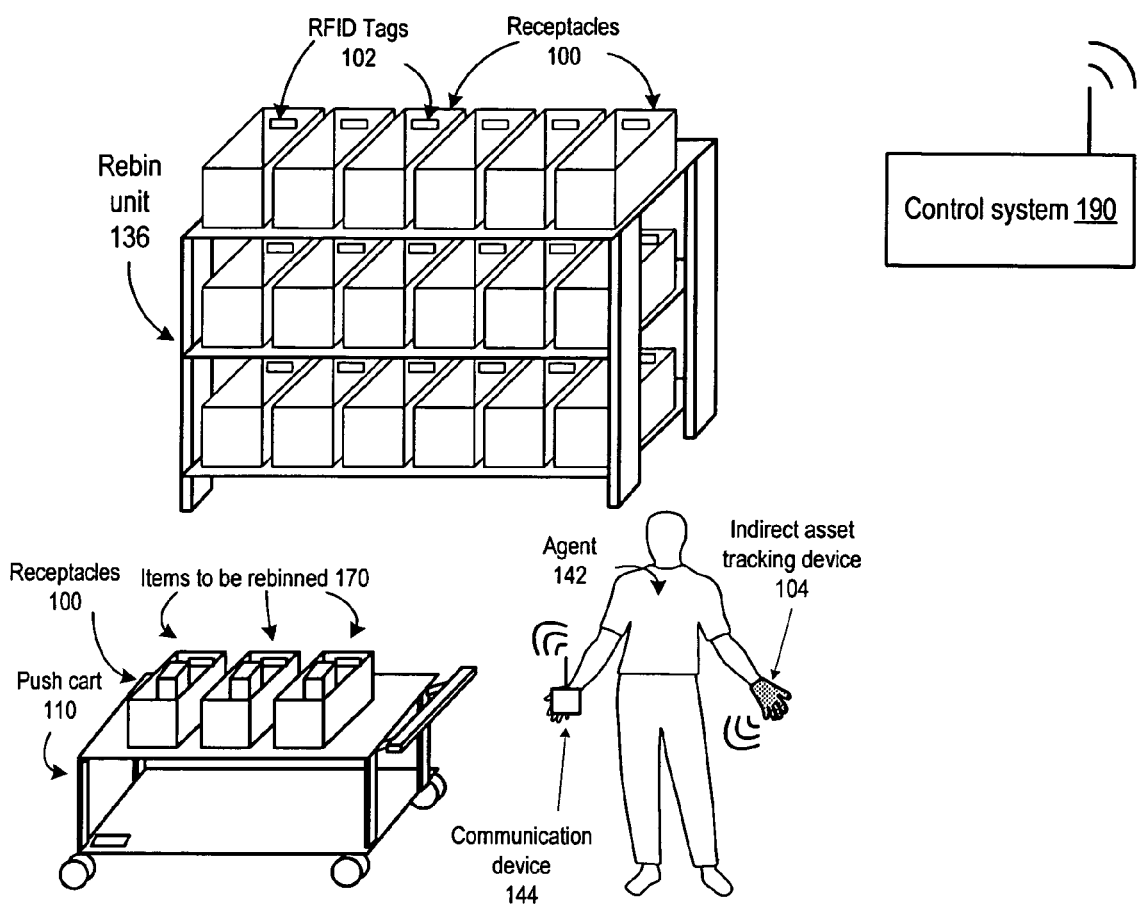
FIG. 14 illustrates an exemplary materials handling facility rebin process using receptacles equipped with RFID tags and agents equipped with indirect asset tracking devices including RFID readers to read the RFID tags according to one embodiment.

FIG. 14 illustrates an exemplary materials handling facility rebin process using receptacles equipped with RFID tags and agents equipped with indirect asset tracking devices including RFID readers to read the RFID tags according to one embodiment. A rebin process refers to the process of rebinning or sorting items picked from stock storage in a pick process (or possibly items obtained from other sources, e.g. directly from receiving) into receptacles of a rebin unit 136 prior to further processing. For example, after the pick process, items may be rebinned as a precursor to the items entering a packaging and shipping process. Rebin unit 136 may be located at a sorting, packing or other downstream station of the materials handling facility. Items rebinned into receptacles 100 of the rebin unit 136 may be removed from rebin unit 136 for further processing. In one embodiment, picked items to be rebinned 170 may be sorted into particular receptacles 100 at rebin station 136. One or more customer orders or partial orders that were picked in the pick process and that are represented by items to be rebinned 170, may be sorted into their respective orders, typically with one order per receptacle 100, at the rebin unit 136.

Note that push cart 110 in FIG. 14 is exemplary of an asset or device that may be used to move or convey items to be rebinned 170 in a materials handling facility, and is not intended to be limiting. In some implementations, agents 142 may convey or move items to be rebinned 170 with other configurations of carts 110 or with other types of devices for moving or conveying items 170. In some cases, an agent 142 may carry one or more items to be rebinned 170 without the use of a device or other cart for moving or conveying items 170. Likewise, the rebin unit 136 in FIG. 14 is exemplary and is not intended to be limiting.

FIG. 14 illustrates an agent 142 equipped with an indirect asset tracking device 104 rebinning items 170 on cart 110 to receptacles 100 equipped with passive RFID tags 102 at a rebin unit 136. After completing a pick run, agent 142 may navigate push cart 110 to a rebin unit 136, which may be located at a downstream order processing station. Once at a rebin unit 136, agent 142 may select an item or items from cart 110 to be rebinned to a receptacle 100. Note that receptacle 100 may be a bin, pallet, chute, tote, box, container, slot, shelf, drawer, cabinet or other subunit (receptacle 100) of the rebin unit 136. In one embodiment, control system 190 may direct the agent 142 as to which rebin unit 136 and/or receptacle 100 of the rebin unit 136 the item(s) are to be rebinned to.

Note that at least some items in inventory may be marked or tagged with a bar code, Universal Product Code (UPC), Stock-Keeping Unit (SKU) code, serial number, and/or other designation (including proprietary designations) to facilitate materials processing facility operations including, but not limited to, rebinning, stowing, picking, sorting and packing. In some materials handling environments, at least some items may be tagged with a radio frequency identification (RFID) tag. These designations, or codes, may identify items by type, and/or may identify individual items within a type of item. In one embodiment, before an item is rebinned to a receptacle 100 of a rebin unit 136, agent 142 may scan or otherwise enter the code for the item to be rebinned in communication device 144. Alternatively, the agent may select a button or other mechanism on the communication device 144 corresponding to the item to indicate the item that is to be rebinned. Communication device 144 may then send a message to the materials handling facility control system 190 indicating the item to be rebinned. In one embodiment, the materials handling facility control system 190 may then indicate to the agent 142 the receptacle 100 to which the item is to be rebinned, via the communications device 144 or, alternatively, by some other mechanism, such as via a light or other indicator on the target receptacle 100 of the rebin unit 136.

Note that, in one embodiment, some or all of the items to be rebinned 170 may be equipped with an RFID tag 102. In this embodiment, the agent 142 may not have to scan or otherwise enter the item(s) into control system 190. Instead, the RFID tags 102 on the items may be passively read by the indirect asset tracking device 104, and this information may be communicated to the control system 190.

When the agent 142 rebins an item 170 from cart 110 to a receptacle 100 of the rebin unit 136, the RFID reader 106 of the indirect asset tracking device 104 of the agent 142 may read the RFID tag(s) 102 on the receptacle 100 when in proximity to the RFID tag(s) 102 of the receptacle 100 (i.e., when the agent extends his hand/arm into or near the receptacle 100 to rebin the item 170). Indirect asset tracking device 104 may then communicate this information to the materials handling facility control system 190.

The passive detection of the receptacle 100 to which an item is being rebinned by the indirect asset tracking device 104 reading the RFID tag 102 during the rebinning motion frees the agent 142 from having to perform any other action or to expend any extra effort to indicate to the control system 190 as to which receptacle 100 the item has been rebinned to. Instead, in one embodiment, the agent 142 may scan or otherwise enter an item, and then rebin the item in a receptacle 100. During the rebin action, the indirect asset tracking device 104 may passively read the RFID tag 102 of the receptacle 100 to which the item is rebinned and communicate this information to the control system 190 to indicate to the control system 190 which receptacle the particular item was rebinned to.

Note that, in some implementations, an agent 142 may scan or otherwise enter two or more similar or different items, or a case or box of similar or different items, and then rebin the multiple items in one motion to a receptacle 100.

In implementations where the control system 190 directs the agent 142 as to which receptacle 100 an item is to be rebinned, the reading of the RFID tag 102 of the receptacle 100 by the indirect asset tracking device 104 may be communicated to and used by the materials handling facility control system 190, for example to verify that the agent 142 has rebinned the item to the correct receptacle 100, and thus may be used to detect errors in rebinning. In one embodiment, if the materials handling facility control system 190 detects from the information that the agent has rebinned an item to an incorrect receptacle 100, an indication may be communicated to the agent 142 that the agent has rebinned to the wrong receptacle 100.

Various audible and/or visible mechanisms may be used to communicate this indication to the agent 142, or a combination of two or more mechanisms may be used. In one embodiment, the indirect asset tracking device 104 may be configured to receive a response from the materials handling facility control system 190 indicating that a rebin was made to a wrong receptacle 100, and to communicate that information to the agent 142. For example, the indirect asset tracking device 104 may be configured to audibly and/or visibly signal to the agent 142 that a rebin was made to a wrong receptacle. In one embodiment, the receptacle(s) 100 of the rebin unit 136 may be configured to receive a response from the materials handling facility control system 190 indicating that a rebin was made to a wrong receptacle, and to audibly and/or visibly communicate that information to the agent 142. In one embodiment, the communication device 144 may be configured to receive a response from the materials handling facility control system 190 indicating that a rebin was made to a wrong receptacle, and to audibly and/or visibly communicate that information to the agent 142. In some embodiments, a combination of two or more of the above mechanisms may be used to indicate to the agent 142 that a rebin was made to a wrong receptacle 100.

Note that an audible communication to the agent may be a beep, tone, buzz, bell, spoken message, or some other type of audible signal or a combination of two or more thereof that sounds to indicate to the agent 142 that a rebin has been performed to the wrong receptacle 100. A visible communication to the agent may be a light, a text message, or some other type of visible signal or a combination of two or more thereof. The visible signal may, for example, be a light that comes on, that goes off, that flashes, and/or that changes in color or intensity to indicate to the agent 142 that a rebin has been performed to the wrong receptacle 100.

Note that, while the above primarily describes a rebin process to rebin picked items 170 into a rebin unit 136 at a downstream station, a similar rebin process using indirect asset tracking with RFID may be used to rebin items 170 in other locations, stations, or storage areas or units in a materials handling facility. Further, note that a method using receptacles equipped with RFID tags and agents equipped with indirect asset tracking devices including RFID readers to read the RFID tags, similar to the method as previously described for the pick process from storage units 134 as illustrated in FIG. 12, may be used at a downstream station when removing items from a rebin unit 136 for processing.

Indoor Positioning System Using RFID Tags and Indirect Asset Tracking Devices

Figure 15:
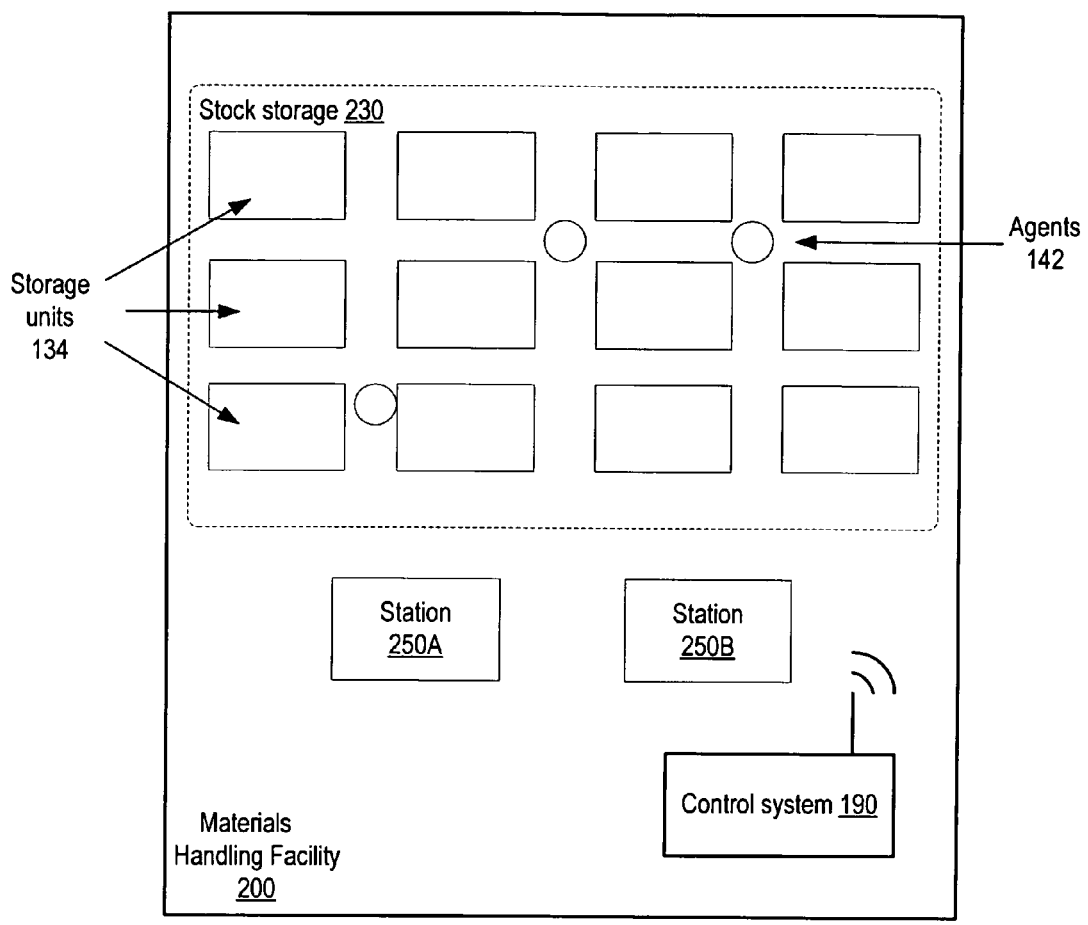
FIG. 15 illustrates a materials handling facility in which RFID tags and indirect asset tracking devices may be used to track the position of agents, according to one embodiment.

In one embodiment, the method and apparatus for indirect asset tracking in materials handling environments with RFID may enable a control system, such as control system 190 of FIGS. 10, 12, 13, and 14, to track the approximate physical location (position) of agents 142 equipped with indirect asset tracking devices 104 in the materials handling facility. FIG. 15 illustrates a materials handling facility in which RFID tags and indirect asset tracking devices may be used to track the position of agents, according to one embodiment. In this embodiment, each storage unit 134 may include one or more receptacles 100 equipped with RFID tags 102. Note that other materials handling equipment, including but not limited to equipment at stations 250, may also include attached or integrated RFID tags. FIGS. 3A and 3B illustrate exemplary receptacles 100 equipped with RFID tags 102. FIG. 4 illustrates exemplary storage units 134 each including two or more receptacles 100 equipped with RFID tags 102. The control system 190 may know, record, and/or track approximately or exactly where each receptacle 100 or other asset equipped with an RFID tag 102 is physically located in the materials handling facility. FIG. 9A illustrates an exemplary table that the control system 190 may use to track the locations of RFID tags 190 in the materials handling facility. The control system may also include a table that associates agents 142 with particular indirect asset tracking devices 104, such as the exemplary table illustrated in FIG. 9B.

In one embodiment, the range of the RFID readers 106 in the indirect asset tracking devices 104 may extend to a few feet or more. In one embodiment, the range of the RFID readers 106 may be extended on demand in order to save power. As an agent 142 equipped with an indirect asset tracking device 104 moves in the materials handling facility 200, the RFID reader 106 in the indirect asset tracking device 104 may read RFID tag 102 information from RFID tags 102 on receptacles 100 in storage units 134, or possibly on other equipment, within range of the RFID reader 106. This information may be communicated by the indirect asset tracking device 104 to the control system 190. The control system 190 may then compare and cross-reference this information to the stored information on the known location of the RFID tags 102 and the known assignment of the indirect asset tracking device 104 to the agent to determine an approximate location of the particular agent 142. Thus, embodiments may be used to track the approximate location of agents 142 in materials handling facility 200 by reading information from nearby RFID tags 102 and comparing this information to the known location of the RFID tags in the materials handling facility 200.

In one embodiment, RFID tags may be installed in other known and recorded locations and/or on other known and recorded equipment in the materials handling facility 200 to form a grid of known locations. Readings of the RFID tags of the grid by an indirect asset tracking device 104 may then be used to determine the approximate position in the grid of the agent 142 equipped with the indirect asset tracking device 104.

Note that mobile equipment other than agents 142 may also be equipped with RFID readers 106, and a similar mechanism may be used to track the location of the RFID reader-equipped mobile equipment.

In one embodiment, control system 190 may record historical information on the determined locations and/or paths of agents 142. This information may also include time stamps for when the agents(s) were at particular locations. This historical information may, for example, be used in analyzing and possibly finding reductions in travel time in paths taken by agents in various processes, such as picking.

Embodiments of the described indoor positioning system may have applications in a materials handling environment including one or more of, but not limited to:

Reducing the time for agents to locate particular storage units and/or receptacles when picking, stowing, rebinning, etc. by using the detected location of an agent to direct the agent to the correct location. For example, audible or visual feedback may be provided to the agent based on the agent's determined current location and the target location.

Suggesting paths through the materials handling facility to agents (e.g. for training new agents, or for suggesting computer-determined optimal paths from a current location to a target location that may be non-obvious to the human agent).

Discovery or detection of unexpected or abnormal travel patterns by agents.

Fraud detection and labor control (e.g., using historical location information to determine which agent was at a particular location at or around a particular time).

Tracking (or discovering) the location of receptacles or other RFID-tagged materials handling equipment throughout the materials handling facility. For example, when an agent 142 walks past a receptacle 100, the indirect asset tracking device 104 of the agent may read the RFID tag 102 of the receptacle 100 and communicate this information to the control system 190. From this information, and the determined location of the agent 142 from other nearby RFID tags 102 on other equipment that are within range of the indirect asset tracking device 104 of the agent 142, the control system may determine approximately where the receptacle 100 or other asset is. This may be useful, for example, to locate receptacles 100 (or other RFID-tagged equipment) that have become lost, e.g. have been misplaced or possibly confused with another receptacle 100.

Figure 16:
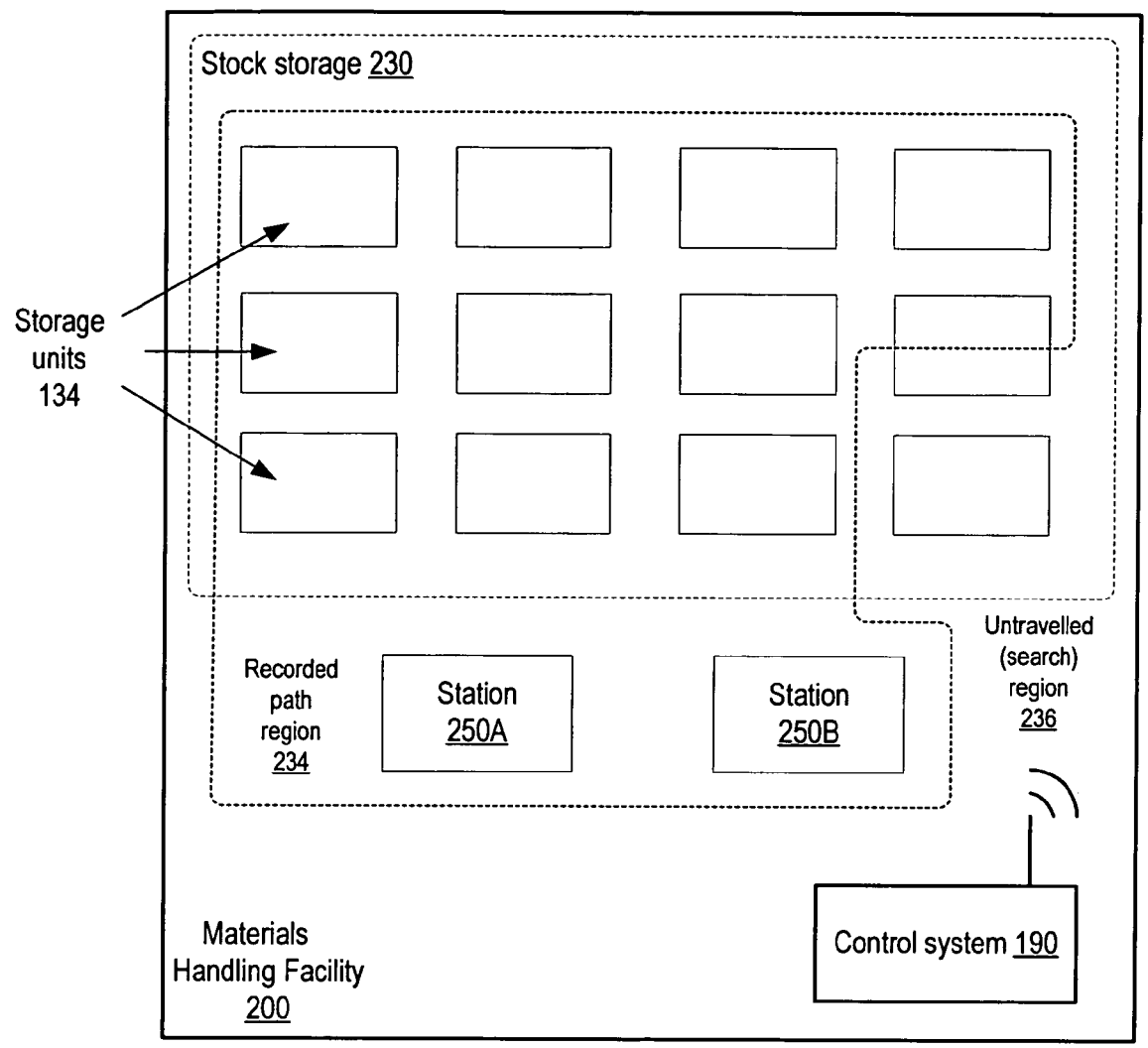
FIG. 16 illustrates a materials handling facility in which RFID tags and indirect asset tracking devices may be used to track and record the paths of agents, and then use that information to narrow down search areas for lost or misplaced RFID-tagged receptacles or other materials handling equipment, according to one embodiment.

FIG. 16 illustrates a materials handling facility in which RFID tags and indirect asset tracking devices may be used to track and record the paths of agents, and then use that information to narrow down search areas for lost or misplaced RFID-tagged receptacles or other materials handling equipment, according to one embodiment. An RFID tagged asset, such as a receptacle 100, may be lost or misplaced within materials handling facility 200. Conventionally, one or more agents 142 may be assigned the task of searching for a misplaced asset. Typically, this might require an exhaustive search of the entire materials handling facility 200, or at least large regions of the materials handling facility 200.

In one embodiment, recorded historical information on the determined locations and/or paths of agents 142 may be used to generate relatively narrow search areas for lost or misplaced equipment tagged with RFID tags 102, such as receptacles 100. In this embodiment, control system may record at least the recent travel paths of agents 142 within the materials handling facility using the RFID tag information read by the indirect asset tracking devices 104 with which the agents 142 are equipped as the agents 142 travel through the facility 200 on various tasks. If an RFID-tagged asset such as a receptacle 100 becomes lost or misplaced, the control system 190 may be used to attempt to locate the lost asset as described above. If that attempt is not successful, the recorded path information for agents 142 over a period may be used to generate a search region 236 that excludes any regions (recorded path region 234) that have been traversed by agents 142 equipped with indirect asset tracking devices 104 within the period.

Figure 17:
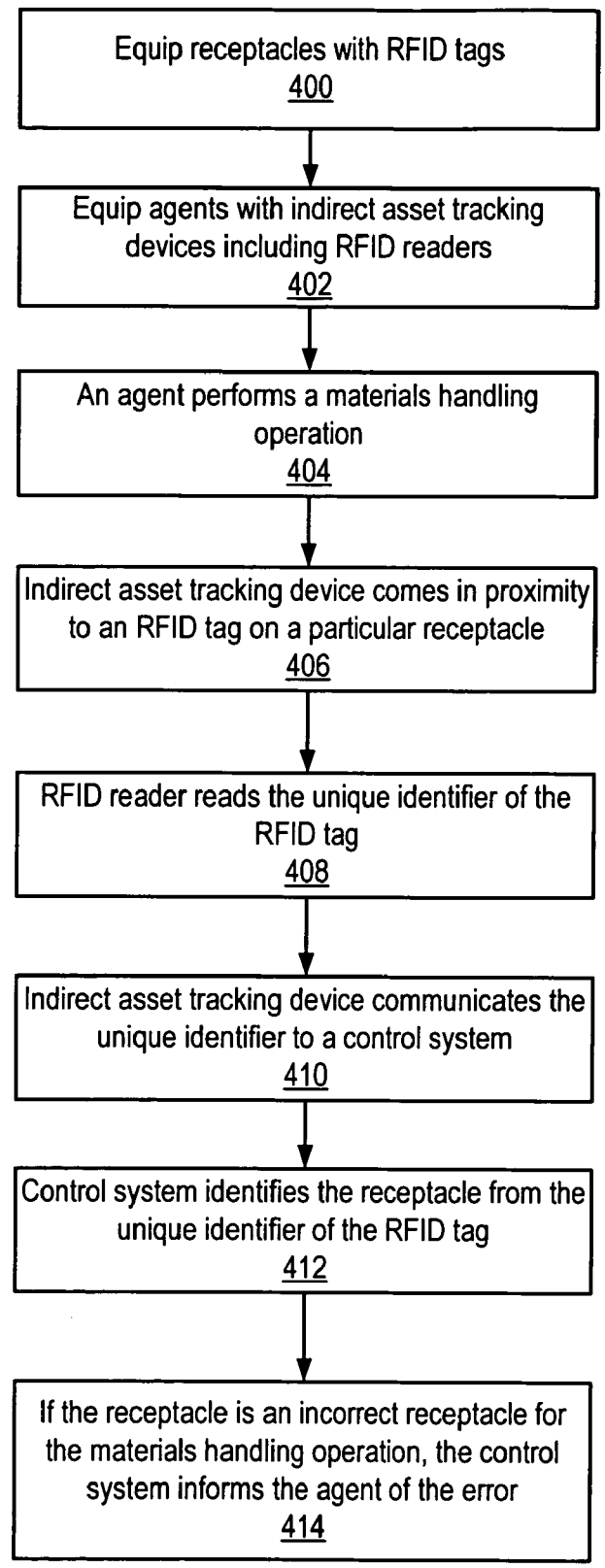
FIG. 17 is a flowchart of a method for indirect asset tracking using RFID according to one embodiment.

FIG. 17 is a flowchart of a method for indirect asset tracking using RFID according to one embodiment. As indicated at 400, each of at least a portion of a plurality of receptacles configured to hold items in a materials handling facility may be equipped with one or more Radio Frequency Identification (RFID) tags. Each RFID tag stores a unique identifier. In one embodiment, the RFID tags may be passive RFID tags.

As indicated at 402, each of one or more human agents of the materials handling facility may be equipped with one or more indirect asset tracking devices. Each indirect asset tracking device may include an integrated or attached RFID reader. Each indirect asset tracking device is configured to be worn on or attached to the hand or lower arm of a human agent. In one embodiment, the indirect asset tracking device is a glove configured to be worn on a hand of a human agent. In one embodiment, the indirect asset tracking device is a wristband configured to be worn on or attached to a wrist or lower arm of a human agent. Other embodiments may use other configurations of indirect asset tracking devices.

As indicated at 404, an agent equipped with an indirect asset tracking device may perform a materials handling operation. In one embodiment, the operation may be assigned to the agent by a materials handling facility control system. Exemplary materials handling operations that may be assigned to and performed by human agents equipped with indirect asset tracking devices may include one or more of, but are not limited to: picking operations, in which the human agent picks one or more items from particular receptacles in one or more storage units and picks the items to one or more receptacles, for example receptacles on a push cart; stow operations, in which the human agent is stowing one or more items to particular receptacles, for example receptacles in storage units of the materials handling facility; and rebin operations, in which the human agent is rebinning one or more items to particular receptacles, for example receptacles in storage units of the materials handling facility. Note that embodiments may be used in performing other materials handling operations. Further, note that the particular receptacles for an operation may be assigned to the human agent by the materials handling facility control system.

As indicated at 406, during the performance of a materials handling operation, the indirect asset tracking device of an agent performing the operation may come in proximity to an RFID tag on a particular receptacle. For example, the agent may extend a hand or arm on which the indirect asset tracking device is worn or to which the indirect asset tracking device is attached into the particular receptacle to place an item in or remove an item from the receptacle. When in proximity to the RFID tag, the RFID reader of the indirect asset tracking device may read the unique identifier of the RFID tag, as indicated at 408. The indirect asset tracking device may then communicates the unique identifier of the RFID tag to the control system, as indicated at 410. In one embodiment, communication between the indirect asset tracking device and the control system may be performed in accordance with a wireless communications mechanism. Note that the passive reading of the RFID tag by the indirect asset tracking device during performance of the materials handling operation may free the agent from having to scan or otherwise enter the receptacle into the control system. In addition, note that, in one embodiment, the items are not necessarily equipped with RFID tags that are readable by the indirect asset tracking devices.

As indicated at 412, the control system may then identify the particular receptacle from the communicated unique identifier of the RFID tag with which the receptacle is equipped. In one embodiment, the control system may maintain a table of location information for each of the receptacles in the materials handling facility equipped with RFID tags and the associated unique identifier of the RFID tag for each receptacle. The control system may then find the location of the particular receptacle in the materials handling facility to which the RFID reader of the indirect asset tracking device is proximate by locating the communicated unique identifier of the RFID tag in the table. Since the control system knows which receptacle(s) the materials handling operation is to be performed from or to, the control system can determine if the operation was performed from or to a correct or incorrect receptacle. As indicated at 414, if the control system determines that the receptacle for which the unique identifier of an RFID tag was communicated is an incorrect receptacle for the materials handling operation, the control system may inform the agent of the error. Any of a variety of audible and/or visual mechanisms may be used to inform the agent, as previously described. In one embodiment, an audible and/or visual feedback mechanism may be integrated with or attached to the indirect asset tracking device to message the agent. Note that, in one embodiment, if a materials handling operation is determined to have been performed to or from a correct receptacle by the control system, the correct operation may be communicated to the agent by the control system.

Figure 18:
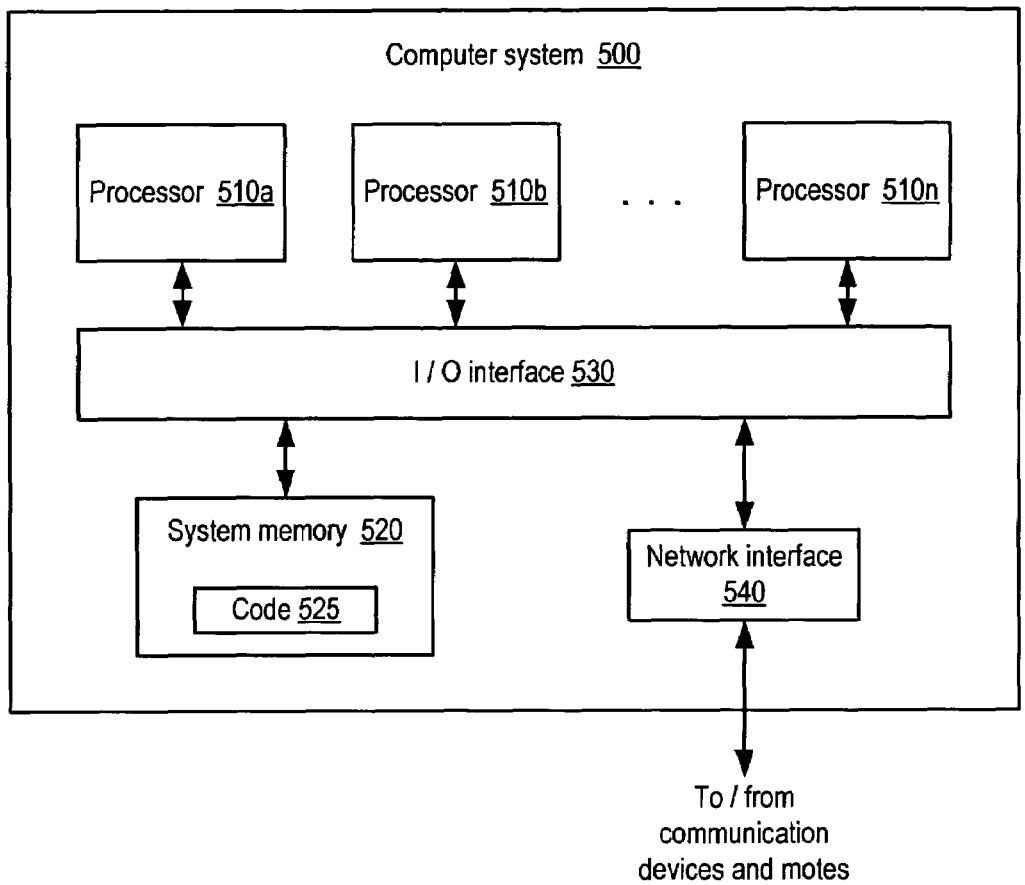
FIG. 18 is a block diagram illustrating an exemplary embodiment of a computer system.

In one embodiment, a materials handling facility control system, such as control system 190 illustrated in FIGS. 10, 12 and 13, may include a general-purpose computer system that includes or is configured to access one or more computer-accessible media, such as computer system 500 illustrated in FIG. 18. In the illustrated embodiment, computer system 500 includes one or more processors 510 coupled to a system memory 520 via an input/output (I/O) interface 530. Computer system 500 further includes a network interface 540 coupled to I/O interface 530. In some embodiments, computer system 500 may be illustrative of control system 190, while in other embodiments control system 190 may include elements in addition to computer system 500.

In various embodiments, computer system 500 may be a uniprocessor system including one processor 510, or a multiprocessor system including several processors 510 (e.g., two, four, eight, or another suitable number). Processors 510 may be any suitable processors capable of executing instructions. For example, in various embodiments, processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store instructions and data accessible by process 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those methods and techniques described above for a materials handling facility control system 190, are shown stored within system memory 520 as code 525.

In one embodiment, I/O interface 530 may be configured to coordinate I/O traffic between processor 510, system memory 520, and any peripheral devices in the device, including network interface 540 or other peripheral interfaces. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices on a network, such as other computer systems, for example. In particular, network interface 540 may be configured to allow communication between computer system 500 and the various communication devices 144 and, in some embodiments, indirect asset tracking devices 104 or other locations of RFID readers described above. Network interface 540 may commonly support one or more wireless networking protocols (e.g., Wi-Fi/IEEE 802.11, or another wireless networking standard). However, in various embodiments, network interface 540 may support communication via any suitable wired or wireless general data networks, such as other types of Ethernet network, for example. Additionally, network interface 540 may support communication via telecommunications/telephony networks such as analog voice networks or digital fiber communications networks, via storage area networks such as Fibre Channel SANs, or via any other suitable type of network and/or protocol.

In some embodiments, system memory 520 may be one embodiment of a computer-accessible medium configured to store program instructions and data as described above. However, in other embodiments, program instructions and/or data may be received, sent or stored upon different types of computer-accessible media. Generally speaking, a computer-accessible medium may include storage media or memory media such as magnetic or optical media, e.g., disk or DVD/CD coupled to computer system 500 via I/O interface 530. A computer-accessible medium may also include any volatile or non-volatile media such as RAM (e.g. SDRAM, DDR SDRAM, RDRAM, SRAM, etc.), ROM, etc, that may be included in some embodiments of computer system 500 as system memory 520 or another type of memory. Further, a computer-accessible medium may include transmission media or signals such as electrical, electromagnetic, or digital signals, conveyed via a communication medium such as a network and/or a wireless link, such as may be implemented via network interface 540.

In one embodiment, the relationship between a control system 190 and communication devices 144 or other devices such as indirect asset tracking devices 104 may be a server/client type of relationship. For example, control system 190 may be configured as a server computer system 500 that may convey instructions to and receive acknowledgements from communication devices 144. In such an embodiment, communication devices 144 may be relatively simple or "thin" client devices. For example, communication devices 144 may be configured as dumb terminals with display, data entry and communications capabilities, but otherwise little computational functionality. However, it is contemplated that in some embodiments, communication devices 144 may be computer systems configured similarly to computer system 500, including one or more processors 510 and various other devices (though in some embodiments, a computer system 500 implementing a communication device 144 may have somewhat different devices, or different classes of devices, compared to a computer system 500 implementing control system 190). It is further contemplated that in some embodiments, the functionality of control system 190 may be distributed across some or all of communication devices 144 and/or other devices. That is, in some embodiments, there may be no centralized point of control of the activity of order fulfillment center agents; rather, communication devices 144 and other devices may function in a cooperative, distributed fashion to coordinate the activities of the order fulfillment center as described herein.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. As well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A materials handling facility, comprising:
a plurality of receptacles configured to receive one or more items of a plurality of items, wherein each receptacle is associated with a Radio Frequency Identification (RFID) tag, wherein each RFID tag stores a unique identifier, and wherein each of the plurality of items possesses an item identifier, but does not possess an RFID;
one or more indirect asset tracking devices, wherein each indirect asset tracking device comprises an RFID reader, and wherein each indirect asset tracking device is configured to be worn on or attached to an extremity of an agent of the materials handling facility; and
one or more item-identifier readers for reading the item identifiers for the plurality of items;
wherein, when in proximity to an RFID tag associated with a particular receptacle, the RFID reader of an indirect asset tracking device is configured to read the unique identifier of the RFID tag associated with the particular receptacle, and to communicate the unique identifier of the RFID tag to a control system;
wherein, for one of the items being placed into or removed from the particular receptacle, one of the one or more item-identifier readers is configured to read the item identifier for that item, and to communicate the item identifier to the control system;
wherein the control system is configured to use the unique identifier from the RFID reader and the item identifier from the item-identifier reader to associate the particular receptacle with the item being placed into or removed from the particular receptacle.

2. The materials handling facility as recited in claim 1, wherein the control system is configured to identify the particular receptacle to which the RFID reader of the indirect asset tracking device is proximate from the communicated unique identifier of the RFID tag associated with the particular receptacle.

3. The materials handling facility as recited in claim 1, wherein the control system is further configured to inform the agent if the particular receptacle is an incorrect receptacle for a materials handling operation currently being performed by the agent.

4. The materials handling facility as recited in claim 3, wherein the materials handling operation is a pick operation in which the agent is picking an item from the particular receptacle.

5. The materials handling facility as recited in claim 3, wherein the materials handling operation is a pick operation in which the agent is picking an item to the particular receptacle.

6. The materials handling facility as recited in claim 3, wherein the materials handling operation is a stow operation in which the agent is stowing an item in the particular receptacle.

7. The materials handling facility as recited in claim 3, wherein the materials handling operation is a rebin operation in which the agent is rebinning an item to the particular receptacle.

8. The materials handling facility as recited in claim 1, wherein the indirect asset tracking device is further configured to communicate the unique identifier of the RFID tag of the particular receptacle to the control system via wireless communication.

9. The materials handling facility as recited in claim 1, wherein the control system is configured to store location information for each of the plurality of receptacles in the materials handling facility and a unique identifier of each RFID tag associated with each of the plurality of receptacles in the materials handling facility.

10. The materials handling facility as recited in claim 9, wherein the control system is further configured to find location information for the particular receptacle in the materials handling facility to which the RFID reader of the indirect asset tracking device is proximate by identifying the communicated unique identifier of the RFID tag with a stored unique identifier of an RFID tag associated with the particular receptacle.

11. The materials handling facility as recited in claim 1, wherein the control system is configured to store a unique identifier for each indirect asset tracking device in the materials handling facility with identification information for an agent to which the indirect asset tracking device has been assigned.

12. The materials handling facility as recited in claim 1, wherein at least a portion of the plurality of receptacles are located on storage units in stock storage of the materials handling facility, wherein each storage unit comprises one or more receptacles.

13. The materials handling facility as recited in claim 1, wherein each RFID tag is integrated with an associated receptacle.

14. The materials handling facility as recited in claim 1, wherein each RFID tag is attached to an associated receptacle.

15. The materials handling facility as recited in claim 1, wherein one or more of the receptacles are pick-to receptacles configured to be carried on one or more mobile carts configured for picking items from inventory of the materials handling facility.

16. The materials handling facility as recited in claim 1, wherein the RFID tags are passive RFID tags.

17. The materials handling facility as recited in claim 1, wherein the RFID reader is integrated with the indirect asset tracking device.

18. The materials handling facility as recited in claim 1, wherein the RFID reader is configured to be attached to the indirect asset tracking device.

19. The materials handling facility as recited in claim 1, wherein the indirect asset tracking device is a glove configured to be worn on a hand of a human agent.

20. The materials handling facility as recited in claim 1, wherein the indirect asset tracking device is a wristband configured to be worn on or attached to a wrist or lower arm of a human agent.

21. The materials handling facility as recited in claim 1, wherein said reading the unique identifier of the RFID tag of the particular receptacle frees the agent from scanning or otherwise entering the particular receptacle into the control system of the materials handling facility.

22. A method, comprising:
equipping each of at least a portion of a plurality of receptacles with a Radio Frequency Identification (RFID) tag, wherein each RFID tag stores a unique identifier, and wherein the plurality of receptacles are configured to receive one or more items of a plurality of items in a materials handling facility, wherein each of the plurality of items possesses an item identifier, but does not possess an RFID;
equipping one or more agents of the materials handling facility with one or more indirect asset tracking devices, wherein each indirect asset tracking device comprises an RFID reader, and wherein each indirect asset tracking device is configured to be worn on or attached to an extremity of the agent; and
providing one or more item-identifier readers for reading the item identifiers for the plurality of items;
the RFID reader of one of the one or more indirect asset tracking devices reading the unique identifier of the RFID tag associated with a particular receptacle when indirect asset tracking devices is in proximity to the RFID tag of a particular receptacle, and communicating the unique identifier of the RFID tag to a control system;
one of the one or more item-identifier readers reading the item identifier for one of the items being placed into or removed from the particular receptacle, and communicating the item identifier to the control system; and
the control system using the unique identifier from the RFID reader and the item identifier from the item-identifier reader to associate the particular receptacle with the item being placed into or removed from the particular receptacle.

23. The method as recited in claim 22, further comprising identifying the particular receptacle to which the RFID reader of the indirect asset tracking device is proximate from the communicated unique identifier of the RFID tag.

24. The method as recited in claim 22, further comprising informing the agent if the particular receptacle is an incorrect receptacle for a materials handling operation currently being performed by the agent.

25. The method as recited in claim 24, wherein the materials handling operation is a pick operation in which the agent is picking an item from the particular receptacle.

26. The method as recited in claim 24, wherein the materials handling operation is a pick operation in which the agent is picking an item to the particular receptacle.

27. The method as recited in claim 24, wherein the materials handling operation is a stow operation in which the agent is stowing an item in the particular receptacle.

28. The method as recited in claim 24, wherein the materials handling operation is a rebin operation in which the agent is rebinning an item to the particular receptacle.

29. The method as recited in claim 22, wherein said communicating the unique identifier of the RFID tag of the particular receptacle from the indirect asset tracking device to a control system of the materials handling facility is performed in accordance with wireless communication.

30. The method as recited in claim 22, further comprising storing on the control system location information for each of the plurality of receptacles in the materials handling facility and a unique identifier of each RFID tag associated with each of the plurality of receptacles in the materials handling facility.

31. The method as recited in claim 30, further comprising finding location information for the particular receptacle in the materials handling facility to which the RFID reader of the indirect asset tracking device is proximate by identifying the communicated unique identifier of the RFID tag with a stored unique identifier of an RFID tag associated with the particular receptacle.

32. The method as recited in claim 22, further comprising storing a unique identifier for each indirect asset tracking device in the materials handling facility with identification information for an agent to which the indirect asset tracking device has been assigned on the control system.

33. The method as recited in claim 22, wherein at least a portion of the plurality of receptacles are located on storage units in stock storage of the materials handling facility, wherein each storage unit comprises one or more receptacles.

34. The method as recited in claim 22, wherein each RFID tag is integrated with an associated receptacle.

35. The method as recited in claim 22, wherein each RFID tag is attached to an associated receptacle.

36. The method as recited in claim 22, wherein one or more of the receptacles are pick-to receptacles configured to be carried on one or more mobile carts configured for picking items from inventory of the materials handling facility.

37. The method as recited in claim 22, wherein the RFID tags are passive RFID tags.

38. The method as recited in claim 22, wherein the RFID reader is integrated with the indirect asset tracking device.

39. The method as recited in claim 22, wherein the RFID reader is configured to be attached to the indirect asset tracking device.

40. The method as recited in claim 22, wherein the indirect asset tracking device is a glove configured to be worn on a hand of a human agent.

41. The method as recited in claim 22, wherein the indirect asset tracking device is a wristband configured to be worn on or attached to a wrist or lower arm of a human agent.

42. The method as recited in claim 22, wherein said reading the unique identifier of the RFID tag of the particular receptacle frees the agent from scanning or otherwise entering the particular receptacle into the control system of the materials handling facility.

43. A computer-accessible storage medium comprising program instructions, wherein the program instructions are computer-executable to implement a control system configured to perform:
receiving from an indirect asset tracking device a unique identifier read from a Radio Frequency Identification (RFID) tag of a particular receptacle in a materials handling facility in response to the indirect asset tracking device being in proximity to the RFID tag of the particular receptacle;
wherein the particular receptacle is one of a plurality of receptacles each configured to receive one or more items of a plurality of items in the materials handling facility, wherein each of the plurality of receptacles is associated with an RFID tag, wherein each RFID tag stores a unique identifier, and wherein each of the plurality of items possesses an item identifier, but does not possess an RFID;
wherein each of one or more agents of the materials handling facility is equipped with one or more indirect asset tracking devices, wherein each indirect asset tracking device comprises an RFID reader configured to read RFID tags, and wherein each indirect asset tracking device is configured to be worn on or attached to an extremity of the agent;
receiving an item identifier for an item being placed into or removed from the particular receptacle, wherein the item identifier is read by an item-identifier reader;
using the received unique identifier and the received item identifier to associate the particular receptacle with the item being placed into or removed from the particular receptacle.

44. The computer-accessible medium as recited in claim 43, wherein the program instructions are further configured to implement informing the agent if the particular receptacle is an incorrect receptacle for a materials handling operation currently being performed by the agent.

45. The computer-accessible medium as recited in claim 44, wherein the materials handling operation is a pick operation in which the agent is picking an item from the particular receptacle.

46. The computer-accessible medium as recited in claim 44, wherein the materials handling operation is a pick operation in which the agent is picking an item to the particular receptacle.

47. The computer-accessible medium as recited in claim 44, wherein the materials handling operation is a stow operation in which the agent is stowing an item in the particular receptacle.

48. The computer-accessible medium as recited in claim 44, wherein the materials handling operation is a rebin operation in which the agent is rebinning an item to the particular receptacle.

49. The computer-accessible medium as recited in claim 43, wherein said receiving the unique identifier of the RFID tag of the particular receptacle from the indirect asset tracking device by the control system of the materials handling facility is performed in accordance with wireless communication.

50. The computer-accessible medium as recited in claim 43, wherein the program instructions are further configured to implement storing on the control system location information for each of the plurality of receptacles in the materials handling facility and the unique identifier of the RFID tag associated with each of the plurality of receptacles in the materials handling facility.

51. The computer-accessible medium as recited in claim 50, wherein the program instructions are further configured to implement finding location information for the particular receptacle in the materials handling facility to which the RFID reader of the indirect asset tracking device is proximate by identifying the communicated unique identifier of the RFID tag with the stored unique identifier of the RFID tag associated with the particular receptacle.

52. The computer-accessible medium as recited in claim 43, wherein the program instructions are further configured to implement storing a unique identifier for each indirect asset tracking device in the materials handling facility with identification information for an agent to which the indirect asset tracking device has been assigned on the control system.

53. The computer-accessible medium as recited in claim 43, wherein at least a portion of the plurality of receptacles are located on storage units in stock storage of the materials handling facility, wherein each storage unit comprises one or more receptacles.

54. The computer-accessible medium as recited in claim 43, wherein each RFID tag is integrated with an associated receptacle.

55. The computer-accessible medium as recited in claim 43, wherein each RFID tag is attached to an associated receptacle.

56. The computer-accessible medium as recited in claim 43, wherein one or more of the receptacles are pick-to receptacles configured to be carried on one or more mobile carts configured for picking items from inventory of the materials handling facility.

57. The computer-accessible medium as recited in claim 43, wherein the RFID tags are passive RFID tags.

58. The computer-accessible medium as recited in claim 43, wherein the RFID reader is integrated with the indirect asset tracking device.

59. The computer-accessible medium as recited in claim 43, wherein the RFID reader is configured to be attached to the indirect asset tracking device.

60. The computer-accessible medium as recited in claim 43, wherein the indirect asset tracking device is a glove configured to be worn on a hand of a human agent.

61. The computer-accessible medium as recited in claim 43, wherein the indirect asset tracking device is a wristband configured to be worn on or attached to a wrist or lower arm of a human agent.

62. The computer-accessible medium as recited in claim 43, wherein said reading the unique identifier of the RFID tag of the particular receptacle frees the agent from scanning or otherwise entering the particular receptacle into a control system of the materials handling facility.

63. A system, comprising:
one or more processors; and
a memory comprising program instructions, wherein the program instructions are executable by the one or more processors to implement a control system configured to:
receive from a Radio Frequency Identification (RFID) reader a unique identifier read from an RFID tag of a particular receptacle in a materials handling facility to which the RFID reader is proximate;
wherein the particular receptacle is one of a plurality of receptacles configured to receive one or more items of a plurality of items in the materials handling facility, wherein each of the plurality of receptacles is equipped with an RFID tag, wherein each RFID tag stores a unique identifier, and wherein each of the plurality of items possesses an item identifier, but does not possess an RFID;
receive an item identifier for an item being placed into or removed from the particular receptacle, wherein the item identifier is read by an item-identifier reader;
use the received unique identifier and the received item identifier to associate the particular receptacle with the item being placed into or removed from the particular receptacle.

64. The system as recited in claim 63, wherein the RFID reader is integrated with or attached to an indirect asset tracking device, and wherein the indirect asset tracking device is configured to be worn on or attached to an extremity of an agent of the materials handling facility.

65. The system as recited in claim 64, wherein the program instructions are further executable by the one or more processors to store a unique identifier for the RFID reader in the materials handling facility with identification information for the agent to which the indirect asset tracking device is assigned.

66. The system as recited in claim 64, wherein the indirect asset tracking device is a glove configured to be worn on a hand of a human agent.

67. The system as recited in claim 64, wherein the indirect asset tracking device is a wristband configured to be worn on or attached to a wrist or lower arm of a human agent.

68. The system as recited in claim 63, wherein the program instructions are further executable by the one or more processors to store location information for each of the plurality of receptacles in the materials handling facility and the unique identifier of the RFID tag associated with each of the plurality of receptacles in the materials handling facility.

69. The system as recited in claim 68, wherein the program instructions are further executable by the one or more processors to find location information for the particular receptacle in the materials handling facility to which the RFID reader of the indirect asset tracking device is proximate by identifying the received unique identifier of the RFID tag with the stored unique identifier of the RFID tag associated with the particular receptacle.

70. The system as recited in claim 63, wherein the program instructions are further executable by the one or more processors to inform an agent of the materials handling facility if the particular receptacle is an incorrect receptacle for a materials handling operation currently being performed by the agent.

71. The system as recited in claim 70, wherein the materials handling operation is a pick operation in which the agent is picking an item from the particular receptacle.

72. The system as recited in claim 70, wherein the materials handling operation is a pick operation in which the agent is picking an item to the particular receptacle.

73. The system as recited in claim 70, wherein the materials handling operation is a stow operation in which the agent is stowing an item in the particular receptacle.

74. The system as recited in claim 70, wherein the materials handling operation is a rebin operation in which the agent is rebinning an item to the particular receptacle.

75. The system as recited in claim 63, wherein at least a portion of the plurality of receptacles are located on storage units in stock storage of the materials handling facility, wherein each storage unit comprises one or more receptacles.

76. The system as recited in claim 63, wherein one or more of the receptacles are pick-to receptacles configured to be carried on one or more mobile carts configured for picking items from inventory of the materials handling facility.

77. The system as recited in claim 63, wherein the RFID tag is a passive RFID tag.

78. An indirect asset tracking device, comprising:
an apparatus for wearing on or attaching to an extremity of an agent of a materials handling facility;
a Radio Frequency Identification (RFID) reader configured to:
read a unique identifier of an RFID tag associated with a particular receptacle within the materials handling facility when in proximity to the RFID tag, wherein the particular receptacle is one of a plurality of receptacles configured to receive one or more items of a plurality of items within the materials handling facility, wherein each receptacle is associated with a Radio Frequency Identification (RFID) tags, wherein each RFID tag stores a unique identifier, and wherein each of the plurality of items possesses an item identifier, but does not possess an RFID; and
communicate the unique identifier of the RFID tag associated with the particular receptacle from the indirect asset tracking device to a control system of the materials handling facility; and
an item-identifier reader configured to read the item identifier for one of the plurality of items being placed into or removed from the particular receptacle, and to communicate the read item identifier to the control system.

79. The indirect asset tracking device as recited in claim 78, wherein the control system is configured to:
identify the particular receptacle to which the RFID reader of the indirect asset tracking device is proximate from the communicated unique identifier of the RFID tag associated with the particular receptacle; and
inform an agent of the materials handling facility if the particular receptacle is an incorrect receptacle for a materials handling operation currently being performed by the agent.

80. The indirect asset tracking device as recited in claim 79, wherein the materials handling operation is a pick operation in which the agent is picking an item from the particular receptacle.

81. The indirect asset tracking device as recited in claim 79, wherein the materials handling operation is a pick operation in which the agent is picking an item to the particular receptacle.

82. The indirect asset tracking device as recited in claim 79, wherein the materials handling operation is a stow operation in which the agent is stowing an item in the particular receptacle.

83. The indirect asset tracking device as recited in claim 79, wherein the materials handling operation is a rebin operation in which the agent is rebinning an item to the particular receptacle.

84. The indirect asset tracking device as recited in claim 78, wherein the apparatus is a glove configured to be worn on the hand of a human agent.

85. The indirect asset tracking device as recited in claim 78, wherein the apparatus is a wristband configured to be worn on or attached to a wrist or lower arm of a human agent.

* * * * *